(12) United States Patent
Courbage et al.

(10) Patent No.: US 10,650,449 B2
(45) Date of Patent: *May 12, 2020

(54) SYSTEM AND METHOD FOR PROVIDING AN AGGREGATION TOOL

(71) Applicant: EXPERIAN INFORMATION SOLUTIONS, INC., Costa Mesa, CA (US)

(72) Inventors: Magali Courbage, Richardson, TX (US); Richard Rodenbusch, Allen, TX (US); Jean-Dominique Morani, Irving, TX (US)

(73) Assignee: EXPERIAN INFORMATION SOLUTIONS, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,766

(22) Filed: Aug. 20, 2019

(65) Prior Publication Data

US 2020/0043091 A1 Feb. 6, 2020

Related U.S. Application Data

(63) Continuation of application No. 16/132,156, filed on Sep. 14, 2018, now Pat. No. 10,402,901, which is a
(Continued)

(51) Int. Cl.
*G06Q 40/00* (2012.01)
*G06Q 40/02* (2012.01)
(Continued)

(52) U.S. Cl.
CPC .......... *G06Q 40/025* (2013.01); *G06F 16/90* (2019.01); *G06Q 40/04* (2013.01); *G06F 1/00* (2013.01); *G06F 11/07* (2013.01); *G06F 11/22* (2013.01)

(58) Field of Classification Search
USPC ................... 705/38, 40, 39, 45, 37, 36, 305; 707/748, 737; 345/581; 715/208;
(Continued)

(56) References Cited

U.S. PATENT DOCUMENTS 3,316,395 A 4/1967 Lavin et al.
4,305,059 A 12/1981 Benton
(Continued)

FOREIGN PATENT DOCUMENTS

DE 91 08 341 10/1991
EP 0 350 907 1/1990
(Continued)

OTHER PUBLICATIONS

U.S. Appl. No. 12/022,954, U.S. Pat. No. 8,606,666, System and Method for Providing an Aggregation Tool, filed Jan. 30, 2008.
(Continued)

*Primary Examiner* — Tien C Nguyen
(74) *Attorney, Agent, or Firm* — Knobbe, Martens, Olson & Bear, LLP

(57) ABSTRACT

Embodiments of the present invention assist in the development, management, and deployment of aggregated data attributes for multiple data sources. One embodiment provides a development interface that allows for elements of attributes, including filters, to be moved into a coding area in which an attribute or an attribute element is being edited. In another embodiment, the user interface presents data fields to assist in the development of filters for multiple data sources with divergent formats. The application further provides a validation interface through which users can validate attributes and trace the results returned by various elements referenced by the attributes under validation. Another embodiment provides a system for managing attributes and deploying them to various systems by creating a
(Continued)

deployment file that is used by an attribute calculation system. In one embodiment, the attribute calculation system is a scalable system that dynamically calculates attributes for multiple data sources.

20 Claims, 17 Drawing Sheets

Related U.S. Application Data continuation of application No. 15/464,089, filed on Mar. 20, 2017, now Pat. No. 10,078,868, which is a continuation of application No. 14/091,174, filed on Nov. 26, 2013, now Pat. No. 9,619,579, which is a continuation of application No. 12/022,954, filed on Jan. 30, 2008, now Pat. No. 8,606,666.

(60) Provisional application No. 60/887,523, filed on Jan. 31, 2007.

(51) Int. Cl.
*G06Q 40/04* (2012.01)
*G06F 16/90* (2019.01)
*G06F 11/22* (2006.01)
*G06F 1/00* (2006.01)
*G06F 11/07* (2006.01)

(58) Field of Classification Search
USPC .............................................. 709/217; 703/6
See application file for complete search history.

(56) References Cited

U.S. PATENT DOCUMENTS

| | | | |
|---|---|---|---|
| 4,371,739 A | 2/1983 | Lewis et al. | |
| 4,398,055 A | 8/1983 | Ijaz et al. | |
| 4,578,530 A | 3/1986 | Zeidler | |
| 4,617,195 A | 10/1986 | Mental | |
| 4,672,149 A | 6/1987 | Yoshikawa et al. | |
| 4,736,294 A | 4/1988 | Gill | |
| 4,754,544 A | 7/1988 | Hanak | |
| 4,774,664 A | 9/1988 | Campbell et al. | |
| 4,812,628 A | 3/1989 | Boston et al. | |
| 4,827,508 A | 5/1989 | Shear | |
| 4,868,570 A | 9/1989 | Davis | |
| 4,876,592 A | 10/1989 | Von Kohorn | |
| 4,895,518 A | 1/1990 | Arnold | |
| 4,935,870 A | 6/1990 | Burk, Jr. et al. | |
| 4,947,028 A | 8/1990 | Gorog | |
| 5,025,138 A | 6/1991 | Cuervo | |
| 5,025,373 A | 6/1991 | Keyser, Jr. et al. | |
| 5,034,807 A | 7/1991 | Von Kohorn | |
| 5,060,153 A | 10/1991 | Nakagawa | |
| 5,148,365 A | 9/1992 | Dembo | |
| 5,201,010 A | 4/1993 | Deaton et al. | |
| 5,216,612 A | 6/1993 | Cornett et al. | |
| 5,220,501 A | 6/1993 | Lawlor et al. | |
| 5,247,575 A | 9/1993 | Sprague et al. | |
| 5,259,766 A | 11/1993 | Sack | |
| 5,262,941 A | 11/1993 | Saladin | |
| 5,274,547 A | 12/1993 | Zoffel et al. | |
| 5,297,031 A | 3/1994 | Gutterman et al. | |
| 5,325,509 A | 6/1994 | Lautzenheiser | |
| 5,336,870 A | 8/1994 | Hughes et al. | |
| 5,341,429 A | 8/1994 | Stringer et al. | |
| 5,454,030 A | 9/1995 | de Oliveira et al. | |
| 5,468,988 A | 11/1995 | Glatfelter et al. | |
| 5,504,675 A | 4/1996 | Cragun et al. | |
| 5,528,701 A | 6/1996 | Aref | |
| 5,555,409 A | 9/1996 | Leenstra, Sr. et al. | |
| 5,563,783 A | 10/1996 | Stolfo et al. | |
| 5,583,763 A | 12/1996 | Atcheson et al. | |
| 5,590,038 A | 12/1996 | Pitroda | |
| 5,592,560 A | 1/1997 | Deaton et al. | |
| 5,611,052 A | 3/1997 | Dykstra et al. | |
| 5,615,408 A | 3/1997 | Johnson | |
| 5,621,201 A | 4/1997 | Langhans et al. | |
| 5,629,982 A | 5/1997 | Micali | |
| 5,630,070 A | 5/1997 | Dietrich et al. | |
| 5,630,127 A | 5/1997 | Moore et al. | |
| 5,640,551 A | 6/1997 | Chu et al. | |
| 5,640,577 A | 6/1997 | Scharmer | |
| 5,655,129 A | 8/1997 | Ito | |
| 5,659,731 A | 8/1997 | Gustafson | |
| 5,666,528 A | 9/1997 | Thai | |
| 5,679,176 A | 10/1997 | Tsuzuki et al. | |
| 5,689,651 A | 11/1997 | Lozman | |
| 5,692,107 A | 11/1997 | Simoudis et al. | |
| 5,696,907 A | 12/1997 | Tom | |
| 5,704,029 A | 12/1997 | Wright, Jr. | |
| 5,732,400 A | 3/1998 | Mandler | |
| 5,737,732 A | 4/1998 | Gibson et al. | |
| 5,745,654 A | 4/1998 | Titan | |
| 5,748,098 A | 5/1998 | Grace | |
| 5,765,143 A | 6/1998 | Sheldon et al. | |
| 5,768,423 A | 6/1998 | Aref et al. | |
| 5,771,562 A | 6/1998 | Harvey et al. | |
| 5,774,692 A | 6/1998 | Boyer et al. | |
| 5,774,868 A | 6/1998 | Cragun et al. | |
| 5,774,883 A | 6/1998 | Andersen | |
| 5,778,405 A | 7/1998 | Ogawa | |
| 5,793,972 A | 8/1998 | Shane | |
| 5,797,136 A | 8/1998 | Boyer et al. | |
| 5,802,142 A | 9/1998 | Browne | |
| 5,812,840 A | 9/1998 | Shwartz | |
| 5,819,226 A | 10/1998 | Gopinathan et al. | |
| 5,822,750 A | 10/1998 | Jou et al. | |
| 5,822,751 A | 10/1998 | Gray et al. | |
| 5,825,884 A | 10/1998 | Zdepski et al. | |
| 5,828,833 A | 10/1998 | Belville et al. | |
| 5,832,068 A | 11/1998 | Smith | |
| 5,835,915 A * | 11/1998 | Carr | G06F 11/1458 714/38.14 |
| 5,844,218 A | 12/1998 | Kawan et al. | |
| 5,864,830 A | 2/1999 | Armetta et al. | |
| 5,870,721 A | 2/1999 | Norris | |
| 5,875,108 A | 2/1999 | Hoffberg et al. | |
| 5,875,236 A | 2/1999 | Jankowitz | |
| 5,878,403 A | 3/1999 | DeFrancesco | |
| 5,881,131 A | 3/1999 | Farris et al. | |
| 5,884,287 A | 3/1999 | Edesess | |
| 5,884,289 A | 3/1999 | Anderson et al. | |
| 5,893,090 A | 4/1999 | Friedman et al. | |
| 5,905,985 A | 5/1999 | Malloy et al. | |
| 5,912,839 A | 6/1999 | Ovshinsky et al. | |
| 5,924,082 A | 7/1999 | Silverman et al. | |
| 5,930,764 A | 7/1999 | Melchione et al. | |
| 5,930,774 A | 7/1999 | Chennault | |
| 5,930,776 A | 7/1999 | Dykstra et al. | |
| 5,940,812 A | 8/1999 | Tengel et al. | |
| 5,950,172 A | 9/1999 | Klingman | |
| 5,956,693 A | 9/1999 | Geerlings | |
| 5,963,932 A | 10/1999 | Jakobsson et al. | |
| 5,966,695 A | 10/1999 | Melchione et al. | |
| 5,974,396 A * | 10/1999 | Anderson | G06Q 30/02 705/14.25 |
| 5,995,947 A | 11/1999 | Fraser et al. | |
| 6,014,688 A | 1/2000 | Venkatraman et al. | |
| 6,021,362 A | 2/2000 | Maggard et al. | |
| 6,026,368 A | 2/2000 | Brown et al. | |
| 6,029,139 A | 2/2000 | Cunningham et al. | |
| 6,029,149 A | 2/2000 | Dykstra et al. | |
| 6,029,154 A | 2/2000 | Pettitt | |
| 6,038,551 A | 3/2000 | Barlow et al. | |
| 6,044,357 A | 3/2000 | Garg | |
| 6,058,375 A | 5/2000 | Park | |
| 6,061,658 A | 5/2000 | Chou et al. | |
| 6,061,691 A | 5/2000 | Fox | |
| 6,064,973 A | 5/2000 | Smith et al. | |
| 6,064,987 A | 5/2000 | Walker | |
| 6,070,141 A | 5/2000 | Houvener | |
| 6,070,142 A | 5/2000 | McDonough et al. | |

(56) References Cited

U.S. PATENT DOCUMENTS

| | | | |
|---|---|---|---|
| 6,070,147 A | 5/2000 | Harms et al. | |
| 6,073,140 A | 6/2000 | Morgan et al. | |
| 6,088,686 A | 7/2000 | Walker et al. | |
| 6,094,643 A | 7/2000 | Anderson et al. | |
| 6,105,007 A | 8/2000 | Norris | |
| 6,115,690 A | 9/2000 | Wong | |
| 6,115,693 A | 9/2000 | McDonough et al. | |
| 6,119,103 A | 9/2000 | Basch et al. | |
| 6,121,901 A | 9/2000 | Welch et al. | |
| 6,128,599 A | 10/2000 | Walker | |
| 6,128,602 A | 10/2000 | Northington et al. | |
| 6,128,603 A | 10/2000 | Dent | |
| 6,128,624 A | 10/2000 | Papierniak et al. | |
| 6,134,548 A | 10/2000 | Gottsman et al. | |
| 6,144,957 A | 11/2000 | Cohen et al. | |
| 6,151,601 A | 11/2000 | Papierniak et al. | |
| 6,157,927 A | 12/2000 | Schaefer et al. | |
| 6,178,442 B1 | 1/2001 | Yamazaki | |
| 6,185,543 B1 | 2/2001 | Galperin et al. | |
| 6,198,217 B1 | 3/2001 | Suzuki et al. | |
| 6,202,053 B1 | 3/2001 | Christiansen et al. | |
| 6,208,979 B1 | 3/2001 | Sinclair | |
| 6,223,171 B1 * | 4/2001 | Chaudhuri | G06F 11/3447 707/718 |
| 6,226,408 B1 | 5/2001 | Sirosh | |
| 6,233,566 B1 | 5/2001 | Levine et al. | |
| 6,236,977 B1 | 5/2001 | Verba et al. | |
| 6,239,352 B1 | 5/2001 | Luch | |
| 6,249,770 B1 | 6/2001 | Erwin et al. | |
| 6,254,000 B1 | 7/2001 | Degen et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,266,649 B1 | 7/2001 | Linden et al. | |
| 6,278,055 B1 | 8/2001 | Forrest et al. | |
| 6,285,983 B1 | 9/2001 | Jenkins | |
| 6,285,987 B1 | 9/2001 | Roth et al. | |
| 6,289,252 B1 | 9/2001 | Wilson et al. | |
| 6,304,869 B1 | 10/2001 | Moore et al. | |
| 6,307,958 B1 | 10/2001 | Deaton et al. | |
| 6,311,169 B2 | 10/2001 | Duhon | |
| 6,324,524 B1 | 11/2001 | Lent et al. | |
| 6,330,546 B1 | 12/2001 | Gopinathan et al. | |
| 6,330,575 B1 | 12/2001 | Moore et al. | |
| 6,334,110 B1 | 12/2001 | Walter et al. | |
| 6,339,769 B1 | 1/2002 | Cochrane et al. | |
| 6,345,300 B1 | 2/2002 | Bakshi et al. | |
| 6,366,903 B1 | 4/2002 | Agrawal et al. | |
| 6,385,594 B1 | 5/2002 | Lebda et al. | |
| 6,393,406 B1 | 5/2002 | Eder | |
| 6,405,173 B1 | 6/2002 | Honarvar | |
| 6,405,181 B2 | 6/2002 | Lent et al. | |
| 6,412,012 B1 | 6/2002 | Bieganski et al. | |
| 6,418,436 B1 | 7/2002 | Degen et al. | |
| 6,424,956 B1 | 7/2002 | Werbos | |
| 6,430,539 B1 | 8/2002 | Lazarus et al. | |
| 6,442,577 B1 | 8/2002 | Britton et al. | |
| 6,446,200 B1 | 9/2002 | Ball et al. | |
| 6,456,979 B1 | 9/2002 | Flagg | |
| 6,457,012 B1 | 9/2002 | Jatkowski | |
| 6,496,819 B1 | 12/2002 | Bello et al. | |
| 5,870,721 C1 | 1/2003 | Norris | |
| 6,505,168 B1 | 1/2003 | Rothman et al. | |
| 6,513,018 B1 | 1/2003 | Culhane | |
| 6,523,022 B1 | 2/2003 | Hobbs | |
| 6,523,041 B1 | 2/2003 | Morgan et al. | |
| 6,542,894 B1 | 4/2003 | Lee et al. | |
| 6,549,919 B2 | 4/2003 | Lambert et al. | |
| 6,567,791 B2 | 5/2003 | Lent et al. | |
| 6,574,623 B1 | 6/2003 | Laung et al. | |
| 6,597,775 B2 | 7/2003 | Lawyer et al. | |
| 6,601,234 B1 * | 7/2003 | Bowman-Amuah | G06Q 10/06375 717/108 |
| 6,611,816 B2 | 8/2003 | Lebda et al. | |
| 6,615,193 B1 | 9/2003 | Kingdon et al. | |
| 6,615,247 B1 | 9/2003 | Murphy | |
| 6,622,266 B1 | 9/2003 | Goddard et al. | |
| 6,623,529 B1 | 9/2003 | Lakritz | |
| 6,640,215 B1 | 10/2003 | Galperin et al. | |
| 6,651,220 B1 | 11/2003 | Penteroudakis et al. | |
| 6,654,727 B2 | 11/2003 | Tilton | |
| 6,658,393 B1 | 12/2003 | Basch et al. | |
| 6,665,715 B1 | 12/2003 | Houri | |
| 6,687,713 B2 | 2/2004 | Mattson et al. | |
| 6,708,166 B1 | 3/2004 | Dysart et al. | |
| 6,714,918 B2 | 3/2004 | Hillmer et al. | |
| 6,714,944 B1 | 3/2004 | Shapiro et al. | |
| 6,735,572 B2 | 5/2004 | Landesmann | |
| 6,738,748 B2 | 5/2004 | Wetzer | |
| 6,748,426 B1 | 6/2004 | Shaffer et al. | |
| 6,757,740 B1 | 6/2004 | Parekh et al. | |
| 6,766,327 B2 | 7/2004 | Morgan, Jr. et al. | |
| 6,804,346 B1 | 10/2004 | Mewhinney | |
| 6,804,701 B2 | 10/2004 | Muret et al. | |
| 6,823,319 B1 | 11/2004 | Lynch et al. | |
| 6,836,764 B1 | 12/2004 | Hucal | |
| 6,839,682 B1 | 1/2005 | Blume et al. | |
| 6,839,690 B1 | 1/2005 | Foth et al. | |
| 6,850,606 B2 | 2/2005 | Lawyer et al. | |
| 6,850,895 B2 | 2/2005 | Brodersen et al. | |
| 6,859,785 B2 | 2/2005 | Case | |
| 6,865,566 B2 | 3/2005 | Serrano-Morales et al. | |
| 6,873,979 B2 | 3/2005 | Fishman et al. | |
| 6,901,406 B2 | 5/2005 | Nabe et al. | |
| 6,910,624 B1 | 6/2005 | Natsuno | |
| 6,934,714 B2 | 8/2005 | Meinig | |
| 6,954,757 B2 | 10/2005 | Zargham et al. | |
| 6,959,281 B1 | 10/2005 | Freeling et al. | |
| 6,965,889 B2 | 11/2005 | Serrano-Morales et al. | |
| 6,968,328 B1 | 11/2005 | Kintzer et al. | |
| 6,983,379 B1 | 1/2006 | Spalink et al. | |
| 6,983,478 B1 | 1/2006 | Grauch et al. | |
| 6,985,887 B1 | 1/2006 | Sunstein et al. | |
| 6,991,159 B2 | 1/2006 | Zenou | |
| 6,993,493 B1 | 1/2006 | Galperin et al. | |
| 6,993,514 B2 | 1/2006 | Majoor | |
| 7,000,199 B2 | 2/2006 | Steele et al. | |
| 7,003,504 B1 * | 2/2006 | Angus | G06F 16/254 |
| 7,028,001 B1 | 4/2006 | Muthuswamy et al. | |
| 7,028,052 B2 | 4/2006 | Chapman et al. | |
| 7,031,945 B1 | 4/2006 | Donner | |
| 7,035,855 B1 | 4/2006 | Kilger et al. | |
| 7,039,176 B2 | 5/2006 | Borodow et al. | |
| 7,047,251 B2 | 5/2006 | Reed et al. | |
| 7,050,986 B1 | 5/2006 | Vance et al. | |
| 7,050,989 B1 | 5/2006 | Hurt et al. | |
| 7,054,828 B2 | 5/2006 | Heching et al. | |
| 7,072,963 B2 | 7/2006 | Anderson et al. | |
| 7,076,462 B1 | 7/2006 | Nelson et al. | |
| 7,076,475 B2 | 7/2006 | Honarvar et al. | |
| 7,082,435 B1 | 7/2006 | Guzman et al. | |
| 7,117,172 B1 | 10/2006 | Black | |
| 7,130,853 B2 | 10/2006 | Roller et al. | |
| 7,133,935 B2 | 11/2006 | Hedy | |
| 7,143,063 B2 | 11/2006 | Lent | |
| 7,152,053 B2 | 12/2006 | Serrano-Morales et al. | |
| 7,165,036 B2 | 1/2007 | Kruk et al. | |
| 7,165,037 B2 | 1/2007 | Lazarus et al. | |
| 7,167,907 B2 | 1/2007 | Shaffer et al. | |
| 7,184,974 B2 | 2/2007 | Shishido | |
| 7,185,016 B1 | 2/2007 | Rasmussen | |
| 7,188,169 B2 | 3/2007 | Buus et al. | |
| 7,191,150 B1 | 3/2007 | Shao et al. | |
| 7,200,602 B2 | 4/2007 | Jonas | |
| 7,212,995 B2 | 5/2007 | Schulkins | |
| 7,234,156 B2 | 6/2007 | French et al. | |
| 7,240,059 B2 | 7/2007 | Bayliss et al. | |
| 7,249,048 B1 | 7/2007 | O'Flaherty | |
| 7,249,114 B2 | 7/2007 | Burchetta et al. | |
| 7,263,506 B2 | 8/2007 | Lee et al. | |
| 7,272,591 B1 | 9/2007 | Ghazal et al. | |
| 7,275,083 B1 | 9/2007 | Seibel et al. | |
| 7,277,875 B2 | 10/2007 | Serrano-Morales et al. | |

(56) References Cited

U.S. PATENT DOCUMENTS

| | | |
|---|---|---|
| 7,277,900 B1 | 10/2007 | Ganesh et al. |
| 7,283,974 B2 | 10/2007 | Katz et al. |
| 7,296,734 B2 | 11/2007 | Pliha |
| 7,313,618 B2 | 12/2007 | Braemer et al. |
| 7,314,166 B2 | 1/2008 | Anderson et al. |
| 7,314,167 B1 | 1/2008 | Kiliccote |
| 7,324,962 B1 | 1/2008 | Valliani et al. |
| 7,328,169 B2 | 2/2008 | Temares et al. |
| 7,337,133 B1 | 2/2008 | Bezos et al. |
| 7,343,149 B2 | 3/2008 | Benco |
| 7,346,551 B2 | 3/2008 | Pe Jimenez et al. |
| 7,346,573 B1 | 3/2008 | Cobrinik et al. |
| 7,356,503 B1 | 4/2008 | Johnson et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,324 B1 | 5/2008 | Engin et al. |
| 7,376,603 B1 | 5/2008 | Mayr et al. |
| 7,376,618 B1 | 5/2008 | Anderson et al. |
| 7,376,714 B1 | 5/2008 | Gerken |
| 7,379,880 B1 | 5/2008 | Pathria et al. |
| 7,383,215 B1 | 6/2008 | Navarro et al. |
| 7,386,528 B2 | 6/2008 | Maloche et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,403,942 B1 * | 7/2008 | Bayliss .................. G06F 16/215 707/748 |
| 7,409,362 B2 | 8/2008 | Calabria |
| 7,418,431 B1 | 8/2008 | Nies et al. |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,428,509 B2 | 9/2008 | Klebanoff |
| 7,428,519 B2 | 9/2008 | Minsky et al. |
| 7,428,526 B2 | 9/2008 | Miller et al. |
| 7,433,855 B2 | 10/2008 | Gavan et al. |
| 7,433,864 B2 | 10/2008 | Malik |
| 7,444,302 B2 | 10/2008 | Hu et al. |
| 7,451,113 B1 | 11/2008 | Kasower |
| 7,458,508 B1 | 12/2008 | Shao et al. |
| 7,467,127 B1 | 12/2008 | Baccash et al. |
| 7,467,401 B2 | 12/2008 | Cicchitto |
| 7,472,088 B2 | 12/2008 | Taylor et al. |
| 7,475,118 B2 | 1/2009 | Leiba et al. |
| 7,483,842 B1 | 1/2009 | Fung et al. |
| 7,499,868 B2 | 3/2009 | Galperin et al. |
| 7,505,938 B2 | 3/2009 | Lang et al. |
| 7,509,117 B2 | 3/2009 | Yum |
| 7,512,221 B2 | 3/2009 | Toms |
| 7,516,149 B2 | 4/2009 | Motwani et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,546,266 B2 | 6/2009 | Beirne et al. |
| 7,548,886 B2 | 6/2009 | Kirkland et al. |
| 7,552,089 B2 | 6/2009 | Bruer et al. |
| 7,556,192 B2 | 7/2009 | Wokaty, Jr. |
| 7,562,093 B2 | 7/2009 | Gelb et al. |
| 7,562,184 B2 | 7/2009 | Henmi et al. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,590,589 B2 | 9/2009 | Hoffberg |
| 7,593,893 B1 | 9/2009 | Ladd et al. |
| 7,596,512 B1 | 9/2009 | Raines et al. |
| 7,596,716 B2 | 9/2009 | Frost et al. |
| 7,610,216 B1 | 10/2009 | May et al. |
| 7,610,243 B2 | 10/2009 | Haggerty et al. |
| 7,610,257 B1 * | 10/2009 | Abrahams ............. G06Q 20/10 705/38 |
| 7,610,261 B2 | 10/2009 | Maloche et al. |
| 7,613,671 B2 | 11/2009 | Serrano-Morales et al. |
| 7,620,592 B2 | 11/2009 | O'Mara et al. |
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,653,592 B1 | 1/2010 | Flaxman et al. |
| 7,657,471 B1 | 2/2010 | Sankaran et al. |
| 7,657,540 B1 | 2/2010 | Bayliss |
| 7,668,769 B2 | 2/2010 | Baker et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,676,418 B1 * | 3/2010 | Chung ............. G06Q 10/06393 705/36 R |
| 7,676,751 B2 | 3/2010 | Allen et al. |
| 7,676,756 B2 | 3/2010 | Vedula et al. |
| 7,686,214 B1 | 3/2010 | Shao et al. |
| 7,689,494 B2 | 3/2010 | Torre et al. |
| 7,689,504 B2 | 3/2010 | Warren et al. |
| 7,689,505 B2 | 3/2010 | Kasower |
| 7,689,506 B2 | 3/2010 | Fei et al. |
| 7,690,032 B1 | 3/2010 | Peirce |
| 7,698,163 B2 | 4/2010 | Reed et al. |
| 7,702,550 B2 | 4/2010 | Perg et al. |
| 7,702,576 B2 | 4/2010 | Fahner et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,720,846 B1 | 5/2010 | Bayliss |
| 7,725,300 B2 | 5/2010 | Pinto et al. |
| 7,734,522 B2 | 6/2010 | Johnson et al. |
| 7,734,523 B1 | 6/2010 | Cui et al. |
| 7,734,539 B2 | 6/2010 | Ghosh et al. |
| 7,739,223 B2 | 6/2010 | Vaschillo et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,384 B2 | 7/2010 | Madhogarhia |
| 7,774,272 B2 | 8/2010 | Fahner et al. |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,792,732 B2 | 9/2010 | Haggerty et al. |
| 7,792,864 B1 | 9/2010 | Rice et al. |
| 7,793,835 B1 | 9/2010 | Coggeshall et al. |
| 7,797,252 B2 | 9/2010 | Rosskamm et al. |
| 7,801,811 B1 | 9/2010 | Merrell et al. |
| 7,801,812 B2 | 9/2010 | Conlin et al. |
| 7,801,828 B2 | 9/2010 | Candella et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,813,981 B2 | 10/2010 | Fahner et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,231 B2 | 10/2010 | Rajan |
| 7,822,665 B2 | 10/2010 | Haggerty et al. |
| 7,827,115 B2 | 11/2010 | Weller et al. |
| 7,831,526 B1 | 11/2010 | Crawford et al. |
| 7,835,932 B2 | 11/2010 | Minsky et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,987 B2 | 12/2010 | Haig |
| 7,853,518 B2 | 12/2010 | Cagan |
| 7,853,541 B1 | 12/2010 | Kapadia et al. |
| 7,853,998 B2 | 12/2010 | Blaisdell et al. |

(56) References Cited

U.S. PATENT DOCUMENTS

| | | | |
|---|---|---|---|
| 7,856,397 | B2 | 12/2010 | Whipple et al. |
| 7,856,494 | B2 | 12/2010 | Kulkarni |
| 7,860,782 | B2 | 12/2010 | Cash et al. |
| 7,870,078 | B2 | 1/2011 | Clark et al. |
| 7,877,304 | B1 | 1/2011 | Coulter |
| 7,877,320 | B1 | 1/2011 | Downey |
| 7,890,420 | B2 | 2/2011 | Haggerty et al. |
| 7,908,242 | B1 * | 3/2011 | Achanta ............ G06F 16/2453 707/602 |
| 7,912,770 | B2 | 3/2011 | Haggerty et al. |
| 7,912,842 | B1 | 3/2011 | Bayliss et al. |
| 7,912,865 | B2 | 3/2011 | Akerman et al. |
| 7,925,549 | B2 | 4/2011 | Looney et al. |
| 7,925,582 | B1 | 4/2011 | Kornegay et al. |
| 7,930,196 | B2 | 4/2011 | Fung et al. |
| 7,930,242 | B2 | 4/2011 | Morris et al. |
| 7,930,285 | B2 | 4/2011 | Abraham et al. |
| 7,937,335 | B2 | 5/2011 | Crawford et al. |
| 7,941,363 | B2 | 5/2011 | Tanaka et al. |
| 7,949,597 | B2 | 5/2011 | Zadoorian et al. |
| 7,953,695 | B2 | 5/2011 | Roller et al. |
| 7,958,126 | B2 * | 6/2011 | Schachter ............ G06F 16/9535 707/748 |
| 7,962,404 | B1 | 6/2011 | Metzger, II et al. |
| 7,966,255 | B2 | 6/2011 | Wong et al. |
| 7,970,676 | B2 | 6/2011 | Feinstein |
| 7,970,698 | B2 | 6/2011 | Gupta et al. |
| 7,983,932 | B2 | 7/2011 | Kane |
| 7,983,976 | B2 | 7/2011 | Nafeh et al. |
| 7,991,666 | B2 | 8/2011 | Haggerty et al. |
| 7,991,677 | B2 | 8/2011 | Haggerty et al. |
| 7,991,689 | B1 | 8/2011 | Brunzell et al. |
| 7,991,901 | B2 | 8/2011 | Tarquini et al. |
| 7,996,521 | B2 | 8/2011 | Chamberlain et al. |
| 7,996,912 | B2 | 8/2011 | Spalink et al. |
| 8,005,759 | B2 | 8/2011 | Hirtenstein et al. |
| 8,006,261 | B1 | 8/2011 | Haberman et al. |
| 8,015,045 | B2 | 9/2011 | Galperin et al. |
| 8,019,828 | B2 | 9/2011 | Cash et al. |
| 8,019,843 | B2 | 9/2011 | Cash et al. |
| 8,024,245 | B2 | 9/2011 | Haggerty et al. |
| 8,024,263 | B2 | 9/2011 | Zarikian et al. |
| 8,024,264 | B2 | 9/2011 | Chaudhuri et al. |
| 8,024,778 | B2 | 9/2011 | Cash et al. |
| 8,025,220 | B2 | 9/2011 | Zoldi et al. |
| 8,027,894 | B2 | 9/2011 | Feinstein et al. |
| 8,036,979 | B1 | 10/2011 | Torrez et al. |
| 8,046,271 | B2 | 10/2011 | Jimenez et al. |
| 8,060,424 | B2 | 11/2011 | Kasower |
| 8,065,234 | B2 | 11/2011 | Liao et al. |
| 8,073,752 | B2 | 12/2011 | Haggerty et al. |
| 8,073,768 | B2 | 12/2011 | Haggerty et al. |
| 8,078,524 | B2 | 12/2011 | Crawford et al. |
| 8,082,202 | B2 | 12/2011 | Weiss |
| 8,086,509 | B2 | 12/2011 | Haggerty et al. |
| 8,086,524 | B1 | 12/2011 | Craig et al. |
| 8,086,525 | B2 | 12/2011 | Atwood et al. |
| 8,090,734 | B2 | 1/2012 | Maloche et al. |
| 8,099,341 | B2 | 1/2012 | Varghese |
| 8,099,356 | B2 | 1/2012 | Feinstein et al. |
| 8,099,376 | B2 | 1/2012 | Serrano-Morales et al. |
| 8,103,530 | B2 | 1/2012 | Quiring et al. |
| 8,108,301 | B2 | 1/2012 | Gupta et al. |
| 8,121,918 | B2 | 2/2012 | Haggerty et al. |
| 8,126,805 | B2 | 2/2012 | Sulkowski et al. |
| 8,127,982 | B1 | 3/2012 | Casey et al. |
| 8,127,986 | B1 | 3/2012 | Taylor et al. |
| 8,131,614 | B2 | 3/2012 | Haggerty et al. |
| 8,131,639 | B2 | 3/2012 | Haggerty et al. |
| 8,145,754 | B2 | 3/2012 | Chamberlain et al. |
| 8,150,744 | B2 | 4/2012 | Zoldi |
| 8,160,960 | B1 * | 4/2012 | Fei ..................... G06Q 20/10 705/39 |
| 8,161,104 | B2 | 4/2012 | Tomkow |
| 8,170,938 | B2 | 5/2012 | Haggerty et al. |
| 8,175,945 | B2 | 5/2012 | Haggerty et al. |
| 8,180,654 | B2 | 5/2012 | Berkman et al. |
| 8,185,408 | B2 | 5/2012 | Baldwin, Jr. et al. |
| RE43,474 | E | 6/2012 | Majoor |
| 8,200,595 | B1 | 6/2012 | De Zilwa et al. |
| 8,200,609 | B2 | 6/2012 | Crawford et al. |
| 8,200,693 | B2 | 6/2012 | Steele et al. |
| 8,204,774 | B2 | 6/2012 | Chwast et al. |
| 8,209,250 | B2 | 6/2012 | Bradway et al. |
| 8,214,238 | B1 | 7/2012 | Fairfield et al. |
| 8,214,262 | B1 | 7/2012 | Semprevivo et al. |
| 8,234,209 | B2 | 7/2012 | Zadoorian et al. |
| 8,237,716 | B2 | 8/2012 | Kolipaka et al. |
| 8,255,423 | B2 | 8/2012 | Ralph et al. |
| 8,266,090 | B2 | 9/2012 | Crawford et al. |
| 8,271,378 | B2 | 9/2012 | Chaudhuri et al. |
| 8,271,935 | B2 | 9/2012 | Lewis |
| 8,280,805 | B1 | 10/2012 | Abrahams et al. |
| 8,280,836 | B2 | 10/2012 | Kumar |
| 8,285,577 | B1 | 10/2012 | Galperin et al. |
| 8,285,656 | B1 * | 10/2012 | Chang ............... G06F 16/24578 706/15 |
| 8,290,840 | B2 | 10/2012 | Kasower |
| 8,296,205 | B2 | 10/2012 | Zoldi |
| 8,296,229 | B1 | 10/2012 | Yellin et al. |
| 8,312,033 | B1 | 11/2012 | McMillan |
| 8,312,389 | B2 | 11/2012 | Crawford et al. |
| 8,315,942 | B2 | 11/2012 | Haggerty et al. |
| 8,315,943 | B2 | 11/2012 | Torrez et al. |
| 8,321,952 | B2 | 11/2012 | Spalink et al. |
| 8,326,671 | B2 | 12/2012 | Haggerty et al. |
| 8,326,672 | B2 | 12/2012 | Haggerty et al. |
| 8,326,760 | B2 | 12/2012 | Ma et al. |
| 8,352,343 | B2 | 1/2013 | Haggerty et al. |
| 8,364,518 | B1 * | 1/2013 | Blake .................... G06Q 30/02 705/7.32 |
| 8,386,377 | B1 | 2/2013 | Xiong et al. |
| 8,392,334 | B2 | 3/2013 | Hirtenstein et al. |
| 8,401,889 | B2 | 3/2013 | Chwast et al. |
| 8,401,946 | B2 | 3/2013 | Zoldi et al. |
| 8,401,950 | B2 | 3/2013 | Lyons et al. |
| 8,417,587 | B2 | 4/2013 | Jimenez et al. |
| 8,418,254 | B2 | 4/2013 | Britti et al. |
| 8,423,488 | B2 | 4/2013 | Surpi |
| 8,458,074 | B2 | 6/2013 | Showalter |
| 8,463,595 | B1 | 6/2013 | Rehling et al. |
| 8,463,919 | B2 | 6/2013 | Tarquini et al. |
| 8,468,198 | B2 | 6/2013 | Tomkow |
| 8,478,673 | B2 | 7/2013 | Haggerty et al. |
| 8,478,674 | B1 | 7/2013 | Kapczynski et al. |
| 8,510,184 | B2 | 8/2013 | Imrev et al. |
| 8,510,189 | B2 | 8/2013 | Imrey et al. |
| 8,515,828 | B1 | 8/2013 | Wolf et al. |
| 8,515,862 | B2 * | 8/2013 | Zhang .................... G06Q 40/00 705/38 |
| 8,527,596 | B2 | 9/2013 | Long et al. |
| 8,533,322 | B2 | 9/2013 | Chamberlain et al. |
| 8,560,434 | B2 | 10/2013 | Morris et al. |
| 8,595,101 | B1 | 11/2013 | Daukas et al. |
| 8,595,219 | B1 | 11/2013 | Thompson |
| 8,600,854 | B2 | 12/2013 | Mayr et al. |
| 8,600,870 | B2 | 12/2013 | Milana |
| 8,606,626 | B1 | 12/2013 | DeSoto et al. |
| 8,606,666 | B1 | 12/2013 | Courbage et al. |
| 8,626,646 | B2 | 1/2014 | Torrez et al. |
| 8,630,929 | B2 | 1/2014 | Haggerty et al. |
| 8,639,616 | B1 | 1/2014 | Rolenaitis et al. |
| 8,639,920 | B2 | 1/2014 | Stack et al. |
| 8,660,943 | B1 | 2/2014 | Chirehdast |
| 8,682,762 | B2 | 3/2014 | Fahner |
| 8,694,390 | B2 | 4/2014 | Imrey et al. |
| 8,700,597 | B2 | 4/2014 | Gupta et al. |
| 8,706,545 | B2 | 4/2014 | Narayanaswamy et al. |
| 8,706,596 | B2 | 4/2014 | Cohen et al. |
| 8,706,615 | B2 | 4/2014 | Merkle |
| 8,730,241 | B2 | 5/2014 | Chhaparwal et al. |
| 8,732,004 | B1 | 5/2014 | Ramos et al. |
| 8,738,515 | B2 | 5/2014 | Chaudhuri et al. |
| 8,751,378 | B2 | 6/2014 | Dornhelm et al. |

(56) References Cited

U.S. PATENT DOCUMENTS

| | | |
|---|---|---|
| 8,768,826 B2 | 7/2014 | Imrey et al. |
| 8,775,291 B1 | 7/2014 | Mellman et al. |
| 8,775,299 B2 | 7/2014 | Achanta et al. |
| 8,781,953 B2 | 7/2014 | Kasower |
| 8,781,975 B2 | 7/2014 | Bennett et al. |
| 8,825,544 B2 | 9/2014 | Imrey et al. |
| 8,984,022 B1 | 3/2015 | Crawford et al. |
| 9,043,930 B2 | 5/2015 | Britti et al. |
| 9,058,340 B1 | 6/2015 | Chamberlain et al. |
| 9,063,226 B2 | 6/2015 | Zheng et al. |
| 9,087,335 B2 | 7/2015 | Rane et al. |
| 9,123,056 B2 | 9/2015 | Singh et al. |
| 9,292,581 B2 | 3/2016 | Thompson |
| 9,292,860 B2 | 3/2016 | Singh et al. |
| 9,378,500 B2 | 6/2016 | Jimenez et al. |
| 9,483,236 B2 | 11/2016 | Yershov et al. |
| 9,483,727 B2 | 11/2016 | Zhao et al. |
| 9,489,497 B2 | 11/2016 | MaGill et al. |
| 9,508,092 B1 | 11/2016 | De Soto et al. |
| 9,509,711 B1* | 11/2016 | Keanini .............. H04L 63/1433 |
| 9,563,916 B1 | 2/2017 | Torrez et al. |
| 9,619,579 B1 | 4/2017 | Courbage et al. |
| 9,632,847 B2 | 4/2017 | Raghavan et al. |
| 9,652,802 B1* | 5/2017 | Kasower ................ G06Q 40/00 |
| 9,660,869 B2 | 5/2017 | Ripley et al. |
| 9,690,575 B2 | 6/2017 | Prismon et al. |
| 9,710,663 B2 | 7/2017 | Britti et al. |
| 9,721,267 B2 | 8/2017 | Fahner et al. |
| 9,779,187 B1 | 10/2017 | Gao et al. |
| 9,870,589 B1* | 1/2018 | Arnold ................ G06Q 40/025 |
| 9,916,596 B1 | 3/2018 | DeSoto et al. |
| 9,916,621 B1* | 3/2018 | Wasser .................... G06F 3/01 |
| 9,990,270 B2 | 6/2018 | Ballal |
| 10,078,868 B1 | 9/2018 | Courbage et al. |
| 10,083,263 B2 | 9/2018 | Gao et al. |
| 10,121,194 B1 | 11/2018 | Torrez et al. |
| 10,133,562 B2 | 11/2018 | Yershov et al. |
| 10,133,980 B2 | 11/2018 | Turner et al. |
| 10,162,630 B2 | 12/2018 | Bouley et al. |
| 10,178,111 B1 | 1/2019 | Wilson et al. |
| 10,242,019 B1 | 3/2019 | Shan et al. |
| 10,262,362 B1 | 4/2019 | Hu et al. |
| 10,311,466 B1 | 6/2019 | DeSoto et al. |
| 10,366,342 B2 | 7/2019 | Zhao et al. |
| 10,380,508 B2 | 8/2019 | Prismon et al. |
| 10,402,901 B2 | 9/2019 | Courbage et al. |
| 10,445,152 B1 | 10/2019 | Zhang et al. |
| 10,474,566 B2 | 11/2019 | Indurthivenkata et al. |
| 2001/0011245 A1 | 8/2001 | Duhon |
| 2001/0013011 A1 | 8/2001 | Day et al. |
| 2001/0016833 A1 | 8/2001 | Everling et al. |
| 2001/0027413 A1 | 10/2001 | Bhutta |
| 2001/0037332 A1 | 11/2001 | Miller et al. |
| 2001/0039523 A1 | 11/2001 | Iwamoto |
| 2002/0019804 A1 | 2/2002 | Sutton |
| 2002/0023051 A1 | 2/2002 | Kunzle et al. |
| 2002/0023143 A1 | 2/2002 | Stephenson et al. |
| 2002/0026507 A1 | 2/2002 | Sears et al. |
| 2002/0035511 A1 | 3/2002 | Haji et al. |
| 2002/0046096 A1 | 4/2002 | Srinivasan et al. |
| 2002/0049626 A1 | 4/2002 | Mathis et al. |
| 2002/0049701 A1 | 4/2002 | Nabe et al. |
| 2002/0049738 A1 | 4/2002 | Epstein |
| 2002/0052836 A1 | 5/2002 | Galperin et al. |
| 2002/0055869 A1 | 5/2002 | Hegg |
| 2002/0069122 A1 | 6/2002 | Yun et al. |
| 2002/0077964 A1* | 6/2002 | Brody .................... G06Q 30/02 705/38 |
| 2002/0082892 A1 | 6/2002 | Raffel et al. |
| 2002/0087460 A1 | 7/2002 | Hornung |
| 2002/0095360 A1 | 7/2002 | Joao |
| 2002/0099628 A1 | 7/2002 | Takaoka et al. |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0101979 A1* | 8/2002 | Borodow .......... H04L 29/06027 379/265.02 |
| 2002/0103809 A1 | 8/2002 | Starzl et al. |
| 2002/0111816 A1 | 8/2002 | Lortscher et al. |
| 2002/0111845 A1 | 8/2002 | Chong |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0133444 A1 | 9/2002 | Sankaran et al. |
| 2002/0133504 A1 | 9/2002 | Vlahos et al. |
| 2002/0138297 A1 | 9/2002 | Lee |
| 2002/0138331 A1 | 9/2002 | Hosea et al. |
| 2002/0138417 A1 | 9/2002 | Lawrence |
| 2002/0143661 A1 | 10/2002 | Tumulty et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0194099 A1 | 12/2002 | Weiss |
| 2002/0194140 A1 | 12/2002 | Makuck |
| 2002/0198824 A1 | 12/2002 | Cook |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0033261 A1 | 2/2003 | Knegendorf |
| 2003/0036996 A1 | 2/2003 | Lazerson |
| 2003/0041031 A1 | 2/2003 | Hedy |
| 2003/0046222 A1 | 3/2003 | Bard et al. |
| 2003/0046223 A1 | 3/2003 | Crawford et al. |
| 2003/0050882 A1 | 3/2003 | Degen et al. |
| 2003/0061132 A1 | 3/2003 | Yu et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0083893 A1* | 5/2003 | Aliffi .................... G06Q 20/403 705/1.1 |
| 2003/0093311 A1 | 5/2003 | Knowlson |
| 2003/0093366 A1 | 5/2003 | Halper et al. |
| 2003/0097320 A1 | 5/2003 | Gordon |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105696 A1 | 6/2003 | Kalotay et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0113727 A1 | 6/2003 | Girn et al. |
| 2003/0115080 A1 | 6/2003 | Kasravi et al. |
| 2003/0115133 A1 | 6/2003 | Bian |
| 2003/0120591 A1 | 6/2003 | Birkhead et al. |
| 2003/0135451 A1 | 7/2003 | O'Brien et al. |
| 2003/0139986 A1 | 7/2003 | Roberts |
| 2003/0144950 A1 | 7/2003 | O'Brien et al. |
| 2003/0149610 A1 | 8/2003 | Rowan et al. |
| 2003/0158751 A1 | 8/2003 | Suresh et al. |
| 2003/0164497 A1 | 9/2003 | Carcia et al. |
| 2003/0167218 A1 | 9/2003 | Field et al. |
| 2003/0171942 A1 | 9/2003 | Gaito |
| 2003/0182214 A1 | 9/2003 | Taylor |
| 2003/0191731 A1 | 10/2003 | Stewart et al. |

(56) References Cited

U.S. PATENT DOCUMENTS

| | | |
|---|---|---|
| 2003/0195830 A1 | 10/2003 | Merkoulovitch et al. |
| 2003/0195859 A1 | 10/2003 | Lawrence |
| 2003/0205845 A1 | 11/2003 | Pichler et al. |
| 2003/0208428 A1 | 11/2003 | Raynes et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0225656 A1 | 12/2003 | Aberman et al. |
| 2003/0225692 A1 | 12/2003 | Bosch et al. |
| 2003/0229892 A1 | 12/2003 | Sardera |
| 2003/0233323 A1 | 12/2003 | Bilski et al. |
| 2003/0233370 A1* | 12/2003 | Barabas ............... G06F 16/278 |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0010458 A1 | 1/2004 | Friedman |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0029311 A1 | 2/2004 | Snyder et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0046497 A1 | 3/2004 | Shaepkens et al. |
| 2004/0049452 A1 | 3/2004 | Blagg |
| 2004/0054619 A1 | 3/2004 | Watson et al. |
| 2004/0059653 A1 | 3/2004 | Verkuylen et al. |
| 2004/0062213 A1 | 4/2004 | Koss |
| 2004/0078248 A1 | 4/2004 | Altschuler |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0107132 A1 | 6/2004 | Honarvar et al. |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0128150 A1 | 7/2004 | Lundegren |
| 2004/0128227 A1 | 7/2004 | Whipple et al. |
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153448 A1* | 8/2004 | Cheng ............... G06F 16/24535 |
| 2004/0158520 A1 | 8/2004 | Noh |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177046 A1 | 9/2004 | Ogram |
| 2004/0193535 A1 | 9/2004 | Barazesh |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0212299 A1 | 10/2004 | Ishikawa et al. |
| 2004/0220896 A1 | 11/2004 | Finlay et al. |
| 2004/0225586 A1 | 11/2004 | Woods et al. |
| 2004/0225594 A1 | 11/2004 | Nolan, III et al. |
| 2004/0225596 A1 | 11/2004 | Kemper et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0230534 A1 | 11/2004 | McGough |
| 2004/0230820 A1 | 11/2004 | Hui Hsu et al. |
| 2004/0243450 A1* | 12/2004 | Bernard, Jr. ........... G06Q 40/02 705/4 |
| 2004/0243518 A1 | 12/2004 | Clifton et al. |
| 2004/0243588 A1 | 12/2004 | Tanner et al. |
| 2004/0243641 A1 | 12/2004 | Allen et al. |
| 2004/0254868 A1 | 12/2004 | Kirkland et al. |
| 2004/0261116 A1 | 12/2004 | Mckeown et al. |
| 2005/0010513 A1 | 1/2005 | Duckworth et al. |
| 2005/0010555 A1 | 1/2005 | Gallivan |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0049991 A1 | 3/2005 | Aggarwal |
| 2005/0050027 A1 | 3/2005 | Yeh et al. |
| 2005/0058262 A1 | 3/2005 | Timmins et al. |
| 2005/0086261 A1 | 4/2005 | Mammone |
| 2005/0086579 A1* | 4/2005 | Leitner ................ G06Q 30/02 715/229 |
| 2005/0091164 A1 | 4/2005 | Varble |
| 2005/0097039 A1 | 5/2005 | Kulcsar et al. |
| 2005/0102206 A1 | 5/2005 | Savasoglu et al. |
| 2005/0102225 A1 | 5/2005 | Oppenheimer et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0137963 A1 | 6/2005 | Ricketts et al. |
| 2005/0144641 A1 | 6/2005 | Lewis |
| 2005/0149433 A1 | 7/2005 | Rothstein |
| 2005/0154664 A1 | 7/2005 | Guy et al. |
| 2005/0154665 A1 | 7/2005 | Kerr |
| 2005/0159996 A1 | 7/2005 | Lazaraus et al. |
| 2005/0177489 A1 | 8/2005 | Neff et al. |
| 2005/0189414 A1 | 9/2005 | Fano et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209922 A1 | 9/2005 | Hofmeister |
| 2005/0222900 A1 | 10/2005 | Fuloria et al. |
| 2005/0228692 A1 | 10/2005 | Hodgon |
| 2005/0251820 A1 | 11/2005 | Stefanik et al. |
| 2005/0256809 A1 | 11/2005 | Sadri |
| 2005/0262014 A1 | 11/2005 | Fickes |
| 2005/0262158 A1 | 11/2005 | Sauermann |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0288998 A1 | 12/2005 | Verma et al. |
| 2005/0289003 A1* | 12/2005 | Thompson ............. G06Q 30/02 705/14.28 |
| 2006/0004731 A1 | 1/2006 | Seibel et al. |
| 2006/0004753 A1 | 1/2006 | Coifman et al. |
| 2006/0010055 A1 | 1/2006 | Morita et al. |
| 2006/0014129 A1 | 1/2006 | Coleman et al. |
| 2006/0020611 A1 | 1/2006 | Gilbert et al. |
| 2006/0031158 A1 | 2/2006 | Orman |
| 2006/0031747 A1 | 2/2006 | Wada et al. |
| 2006/0032909 A1 | 2/2006 | Seegar |
| 2006/0036543 A1 | 2/2006 | Blagg et al. |
| 2006/0041443 A1 | 2/2006 | Horvath |
| 2006/0041464 A1 | 2/2006 | Powers et al. |
| 2006/0041840 A1* | 2/2006 | Blair .................... G06F 17/227 715/249 |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0074991 A1 | 4/2006 | Lussier et al. |
| 2006/0080126 A1 | 4/2006 | Greer et al. |
| 2006/0080230 A1 | 4/2006 | Freiberg |
| 2006/0080233 A1 | 4/2006 | Mendelovich et al. |

(56) References Cited

U.S. PATENT DOCUMENTS

| | | |
|---|---|---|
| 2006/0080251 A1 | 4/2006 | Fried et al. |
| 2006/0080263 A1 | 4/2006 | Willis et al. |
| 2006/0085331 A1 | 4/2006 | Imrey et al. |
| 2006/0085454 A1 | 4/2006 | Blegen et al. |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1 | 6/2006 | DeRoy et al. |
| 2006/0149674 A1 | 7/2006 | Cook et al. |
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0178189 A1 | 8/2006 | Walker et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0195390 A1 | 8/2006 | Rusk et al. |
| 2006/0202012 A1 | 9/2006 | Grano et al. |
| 2006/0204051 A1 | 9/2006 | Holland, IV |
| 2006/0206416 A1 | 9/2006 | Farias |
| 2006/0212350 A1 | 9/2006 | Ellis et al. |
| 2006/0218069 A1 | 9/2006 | Aberman et al. |
| 2006/0218079 A1 | 9/2006 | Goldblatt et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0239512 A1 | 10/2006 | Petrillo |
| 2006/0241923 A1 | 10/2006 | Xu et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |
| 2006/0265243 A1 | 11/2006 | Racho et al. |
| 2006/0265323 A1 | 11/2006 | Winter et al. |
| 2006/0267999 A1* | 11/2006 | Cash ................. G06Q 40/02 345/581 |
| 2006/0271456 A1 | 11/2006 | Romain et al. |
| 2006/0271457 A1 | 11/2006 | Romain et al. |
| 2006/0271472 A1* | 11/2006 | Cagan ................. G06Q 40/02 705/38 |
| 2006/0271552 A1 | 11/2006 | McChesney et al. |
| 2006/0277092 A1 | 12/2006 | Williams |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0293932 A1* | 12/2006 | Cash ................. G06Q 40/02 705/30 |
| 2006/0293979 A1* | 12/2006 | Cash ................. G06Q 40/025 705/34 |
| 2006/0294199 A1* | 12/2006 | Bertholf ................. G06F 16/972 709/217 |
| 2007/0005508 A1 | 1/2007 | Chiang |
| 2007/0011026 A1 | 1/2007 | Higgins et al. |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0022141 A1 | 1/2007 | Singleton et al. |
| 2007/0027778 A1 | 2/2007 | Schellhammer et al. |
| 2007/0027791 A1 | 2/2007 | Young et al. |
| 2007/0030282 A1* | 2/2007 | Cash ................. G06Q 30/00 345/581 |
| 2007/0033227 A1 | 2/2007 | Gaito et al. |
| 2007/0038483 A1 | 2/2007 | Wood |
| 2007/0043654 A1 | 2/2007 | Libman |
| 2007/0055598 A1 | 3/2007 | Arnott et al. |
| 2007/0055599 A1 | 3/2007 | Arnott |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067285 A1* | 3/2007 | Blume ................. G06F 17/278 |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0078741 A1 | 4/2007 | Haggerty et al. |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0118393 A1 | 5/2007 | Rosen et al. |
| 2007/0156554 A1 | 7/2007 | Nikoley et al. |
| 2007/0156718 A1* | 7/2007 | Hossfeld ................. G06Q 50/20 |
| 2007/0168246 A1 | 7/2007 | Haggerty et al. |
| 2007/0168267 A1 | 7/2007 | Zimmerman et al. |
| 2007/0185797 A1 | 8/2007 | Robinson |
| 2007/0192165 A1 | 8/2007 | Haggerty et al. |
| 2007/0192248 A1 | 8/2007 | West |
| 2007/0205266 A1 | 9/2007 | Carr et al. |
| 2007/0208653 A1 | 9/2007 | Murphy |
| 2007/0220611 A1 | 9/2007 | Socolow et al. |
| 2007/0226093 A1* | 9/2007 | Chan ................. G06Q 40/00 705/35 |
| 2007/0226114 A1 | 9/2007 | Haggerty et al. |
| 2007/0226130 A1 | 9/2007 | Haggerty et al. |
| 2007/0244732 A1 | 10/2007 | Chatterji et al. |
| 2007/0244807 A1 | 10/2007 | Andringa et al. |
| 2007/0271178 A1 | 11/2007 | Davis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288355 A1 | 12/2007 | Roland et al. |
| 2007/0288559 A1 | 12/2007 | Parsadayan |
| 2007/0294163 A1 | 12/2007 | Harmon et al. |
| 2007/0299759 A1 | 12/2007 | Kelly |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010687 A1 | 1/2008 | Gonen et al. |
| 2008/0015887 A1 | 1/2008 | Drabek et al. |
| 2008/0015938 A1 | 1/2008 | Haddad et al. |
| 2008/0016099 A1* | 1/2008 | Ikeda ................. G06Q 30/06 |
| 2008/0021804 A1 | 1/2008 | Deckoff |
| 2008/0028067 A1 | 1/2008 | Berkhin et al. |
| 2008/0033852 A1 | 2/2008 | Megdal et al. |
| 2008/0059224 A1 | 3/2008 | Schechter |
| 2008/0059317 A1* | 3/2008 | Chandran ................. G06Q 20/20 705/16 |
| 2008/0059449 A1 | 3/2008 | Webster et al. |
| 2008/0065774 A1 | 3/2008 | Keeler |
| 2008/0066188 A1 | 3/2008 | Kwak |
| 2008/0071882 A1 | 3/2008 | Hering et al. |
| 2008/0077526 A1 | 3/2008 | Arumugam |
| 2008/0086368 A1 | 4/2008 | Bauman et al. |
| 2008/0091463 A1 | 4/2008 | Shakamuri |
| 2008/0097768 A1 | 4/2008 | Godshalk |
| 2008/0097928 A1 | 4/2008 | Paulson |
| 2008/0103800 A1 | 5/2008 | Domenikos et al. |
| 2008/0103972 A1 | 5/2008 | Lanc |
| 2008/0109444 A1 | 5/2008 | Williams et al. |
| 2008/0120155 A1 | 5/2008 | Pliha |
| 2008/0120569 A1 | 5/2008 | Mann et al. |
| 2008/0126233 A1 | 5/2008 | Hogan |
| 2008/0133322 A1 | 6/2008 | Kalia et al. |

(56) References Cited

U.S. PATENT DOCUMENTS

| | | |
|---|---|---|
| 2008/0133531 A1* | 6/2008 | Baskerville ......... G06F 21/6254 |
| 2008/0134042 A1 | 6/2008 | Jankovich |
| 2008/0140476 A1 | 6/2008 | Anand et al. |
| 2008/0140507 A1 | 6/2008 | Hamlisch et al. |
| 2008/0140549 A1 | 6/2008 | Eder |
| 2008/0140694 A1 | 6/2008 | Mangla |
| 2008/0147454 A1 | 6/2008 | Walker et al. |
| 2008/0167883 A1 | 7/2008 | Thavildar Khazaneh |
| 2008/0167936 A1 | 7/2008 | Kapoor |
| 2008/0175360 A1 | 7/2008 | Schwarz et al. |
| 2008/0177836 A1 | 7/2008 | Bennett |
| 2008/0183504 A1 | 7/2008 | Highley |
| 2008/0183564 A1 | 7/2008 | Tien et al. |
| 2008/0195425 A1 | 8/2008 | Haggerty et al. |
| 2008/0195600 A1 | 8/2008 | Deakter |
| 2008/0208548 A1 | 8/2008 | Metzger et al. |
| 2008/0208631 A1 | 8/2008 | Morita et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222016 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0255897 A1 | 10/2008 | Megdal et al. |
| 2008/0255992 A1 | 10/2008 | Lin |
| 2008/0281737 A1 | 11/2008 | Fajardo |
| 2008/0288382 A1 | 11/2008 | Smith et al. |
| 2008/0294540 A1* | 11/2008 | Celka ................ G06Q 40/00 705/35 |
| 2008/0294546 A1 | 11/2008 | Flannery |
| 2008/0301016 A1 | 12/2008 | Durvasula et al. |
| 2008/0320575 A1 | 12/2008 | Gelb et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044279 A1 | 2/2009 | Crawford et al. |
| 2009/0060343 A1 | 3/2009 | Rosca |
| 2009/0089190 A1 | 4/2009 | Girulat |
| 2009/0089205 A1 | 4/2009 | Bayne |
| 2009/0106150 A1 | 4/2009 | Pelegero et al. |
| 2009/0112650 A1 | 4/2009 | Iwane |
| 2009/0119169 A1 | 5/2009 | Chandratillake et al. |
| 2009/0119199 A1 | 5/2009 | Salahi |
| 2009/0125369 A1 | 5/2009 | Kloostra et al. |
| 2009/0132347 A1 | 5/2009 | Anderson et al. |
| 2009/0132559 A1 | 5/2009 | Chamberlain et al. |
| 2009/0144102 A1 | 6/2009 | Lopez |
| 2009/0144160 A1 | 6/2009 | Haggerty et al. |
| 2009/0182653 A1 | 7/2009 | Zimiles |
| 2009/0199264 A1 | 8/2009 | Lang |
| 2009/0210886 A1 | 8/2009 | Bhojwani et al. |
| 2009/0216591 A1 | 8/2009 | Buerger et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254971 A1 | 10/2009 | Herz et al. |
| 2009/0276368 A1 | 11/2009 | Martin et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0030649 A1 | 2/2010 | Ubelhor |
| 2010/0043055 A1 | 2/2010 | Baumgart |
| 2010/0082384 A1 | 4/2010 | Bohrer et al. |
| 2010/0094758 A1* | 4/2010 | Chamberlain ... G06Q 10/06375 705/50 |
| 2010/0094768 A1 | 4/2010 | Miltonberger |
| 2010/0100945 A1 | 4/2010 | Ozzie et al. |
| 2010/0107225 A1 | 4/2010 | Spencer et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0145836 A1 | 6/2010 | Baker et al. |
| 2010/0145840 A1 | 6/2010 | Kasower |
| 2010/0169159 A1 | 7/2010 | Rose et al. |
| 2010/0169264 A1 | 7/2010 | O'Sullivan |
| 2010/0205662 A1 | 8/2010 | Ibrahim et al. |
| 2010/0211445 A1 | 8/2010 | Bodington |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0229245 A1 | 9/2010 | Singhal |
| 2010/0248681 A1 | 9/2010 | Phills |
| 2010/0250364 A1 | 9/2010 | Song et al. |
| 2010/0250411 A1 | 9/2010 | Ogrodski |
| 2010/0250434 A1 | 9/2010 | Megdal et al. |
| 2010/0250469 A1 | 9/2010 | Megdal et al. |
| 2010/0250497 A1 | 9/2010 | Redlich et al. |
| 2010/0274739 A1 | 10/2010 | Haggerty et al. |
| 2010/0293114 A1 | 11/2010 | Khan et al. |
| 2010/0312717 A1 | 12/2010 | Haggerty et al. |
| 2011/0004498 A1 | 1/2011 | Readshaw |
| 2011/0016042 A1 | 1/2011 | Cho et al. |
| 2011/0023115 A1 | 1/2011 | Wright |
| 2011/0035333 A1 | 2/2011 | Haggerty et al. |
| 2011/0047071 A1 | 2/2011 | Choudhuri et al. |
| 2011/0060905 A1 | 3/2011 | Stack et al. |
| 2011/0066495 A1 | 3/2011 | Ayloo et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0126275 A1 | 5/2011 | Anderson et al. |
| 2011/0131131 A1 | 6/2011 | Griffin et al. |
| 2011/0137760 A1 | 6/2011 | Rudie et al. |
| 2011/0137789 A1 | 6/2011 | Kortina et al. |
| 2011/0161323 A1 | 6/2011 | Hagiwara |
| 2011/0164746 A1 | 7/2011 | Nice et al. |
| 2011/0173116 A1 | 7/2011 | Yan et al. |
| 2011/0178922 A1 | 7/2011 | Imrey et al. |
| 2011/0184838 A1 | 7/2011 | Winters et al. |
| 2011/0184851 A1 | 7/2011 | Megdal et al. |
| 2011/0211445 A1 | 9/2011 | Chen |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |

(56) References Cited

U.S. PATENT DOCUMENTS

| | | |
|---|---|---|
| 2011/0238566 A1 | 9/2011 | Santos |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270779 A1 | 11/2011 | Showalter |
| 2011/0282779 A1 | 11/2011 | Megdal et al. |
| 2012/0005070 A1 | 1/2012 | McFall et al. |
| 2012/0011056 A1 | 1/2012 | Ward et al. |
| 2012/0029956 A1 | 2/2012 | Ghosh et al. |
| 2012/0035980 A1 | 2/2012 | Haggerty et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0066125 A1 | 3/2012 | Ma et al. |
| 2012/0072464 A1 | 3/2012 | Cohen |
| 2012/0084230 A1 | 4/2012 | Megdal et al. |
| 2012/0101938 A1 | 4/2012 | Kasower |
| 2012/0101939 A1 | 4/2012 | Kasower |
| 2012/0106801 A1 | 5/2012 | Jackson |
| 2012/0116807 A1 | 5/2012 | Hane et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0143637 A1 | 6/2012 | Paradis et al. |
| 2012/0173339 A1 | 7/2012 | Flynt et al. |
| 2012/0179536 A1 | 7/2012 | Kalb et al. |
| 2012/0191479 A1 | 7/2012 | Gupta et al. |
| 2012/0265607 A1 | 10/2012 | Belwadi |
| 2012/0265661 A1 | 10/2012 | Megdal et al. |
| 2012/0290660 A1 | 11/2012 | Rao et al. |
| 2013/0085902 A1 | 4/2013 | Chew |
| 2013/0103571 A1 | 4/2013 | Chung et al. |
| 2013/0124392 A1* | 5/2013 | Achanta ............. G06Q 40/00 705/38 |
| 2013/0132151 A1 | 5/2013 | Stibel et al. |
| 2013/0159168 A1 | 6/2013 | Evans |
| 2013/0173359 A1 | 7/2013 | Megdal et al. |
| 2013/0173481 A1 | 7/2013 | Hirtenstein et al. |
| 2013/0238413 A1 | 9/2013 | Carlson et al. |
| 2013/0268324 A1 | 10/2013 | Megdal et al. |
| 2013/0275331 A1 | 10/2013 | Megdal et al. |
| 2013/0293363 A1 | 11/2013 | Plymouth |
| 2014/0012633 A1 | 1/2014 | Megdal et al. |
| 2014/0019331 A1 | 1/2014 | Megdal et al. |
| 2014/0032265 A1 | 1/2014 | Paprocki et al. |
| 2014/0032384 A1 | 1/2014 | Megdal et al. |
| 2014/0096249 A1 | 4/2014 | Dupont et al. |
| 2014/0156501 A1 | 6/2014 | Howe |
| 2014/0164112 A1 | 6/2014 | Kala |
| 2014/0244353 A1 | 8/2014 | Winters |
| 2014/0316969 A1 | 10/2014 | Imrey |
| 2014/0365357 A1 | 12/2014 | Bohrer et al. |
| 2015/0066772 A1 | 3/2015 | Griffin et al. |
| 2015/0332414 A1 | 11/2015 | Unser |
| 2016/0086190 A1 | 3/2016 | Bohrer et al. |
| 2016/0171542 A1 | 6/2016 | Fanous et al. |
| 2016/0210224 A1 | 7/2016 | Cohen et al. |
| 2016/0246581 A1 | 8/2016 | Jimenez et al. |
| 2017/0200222 A1 | 7/2017 | Barber et al. |
| 2017/0278182 A1 | 9/2017 | Kasower |
| 2018/0189871 A1 | 7/2018 | Lennert |
| 2019/0012736 A1 | 1/2019 | Courbage et al. |
| 2019/0318255 A1 | 10/2019 | Ripley et al. |
| 2019/0340526 A1 | 11/2019 | Turner et al. |
| 2019/0347092 A1 | 11/2019 | Bouley et al. |
| 2019/0354613 A1 | 11/2019 | Zoldi et al. |
| 2019/0354853 A1 | 11/2019 | Zoldi et al. |

FOREIGN PATENT DOCUMENTS

| | | |
|---|---|---|
| EP | 0 419 889 | 4/1991 |
| EP | 0 458 698 | 11/1991 |
| EP | 0 468 440 | 1/1992 |
| EP | 0 554 083 | 8/1993 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 977 128 | 2/2000 |
| EP | 1 028 401 | 8/2000 |
| EP | 1 122 664 | 8/2001 |
| EP | 0 772 836 B1 | 12/2001 |
| EP | 3 572 985 | 11/2019 |
| EP | 3 573 009 | 11/2019 |
| GB | 2 392 748 | 3/2004 |
| JP | 10-222559 | 8/1998 |
| JP | 10-261009 | 9/1998 |
| JP | 10-293732 | 11/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2003-316950 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| TW | 256569 | 6/2006 |
| WO | WO 94/006103 | 3/1994 |
| WO | WO 95/034155 | 12/1995 |
| WO | WO 96/000945 | 1/1996 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/004350 | 1/1999 |
| WO | WO 99/008218 | 2/1999 |
| WO | WO 99/017225 | 4/1999 |
| WO | WO 99/017226 | 4/1999 |
| WO | WO 99/038094 | 7/1999 |
| WO | WO 99/046710 | 9/1999 |
| WO | WO 00/004465 | 1/2000 |
| WO | WO 00/028441 | 5/2000 |
| WO | WO 00/055789 | 9/2000 |
| WO | WO 00/055790 | 9/2000 |
| WO | WO 01/010090 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/075754 | 10/2001 |
| WO | WO 01/080053 | 10/2001 |
| WO | WO 01/084281 | 11/2001 |
| WO | WO 02/001462 | 1/2002 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/061563 | 7/2004 |
| WO | WO 2004/114160 | 12/2004 |
| WO | WO 2005/059781 | 6/2005 |
| WO | WO 2007/149941 | 12/2007 |
| WO | WO 2008/022289 | 2/2008 |
| WO | WO 2008/054403 | 5/2008 |
| WO | WO 2008/127288 | 10/2008 |
| WO | WO 2009/076555 | 6/2009 |
| WO | WO 2009/117518 | 9/2009 |
| WO | WO 2009/132114 | 10/2009 |
| WO | WO 2010/132492 | 11/2010 |
| WO | WO 2013/009920 | 1/2013 |
| WO | WO 2014/018900 | 1/2014 |
| WO | WO 2015/162681 | 10/2015 |

(56) References Cited

FOREIGN PATENT DOCUMENTS

| | | |
|---|---|---|
| WO | WO 2018/057701 | 3/2018 |
| WO | WO 2018/128866 | 7/2018 |
| WO | WO 2019/217876 | 11/2019 |

OTHER PUBLICATIONS

U.S. Appl. No. 14/091,174, U.S. Pat. No. 9,619,579, System and Method for Providing an Aggregation Tool, filed Nov. 26, 2013.
U.S. Appl. No. 15/464,089, U.S. Pat. No. 10,078,868, System and Method for Providing an Aggregation Tool, filed Mar. 20, 2017.
U.S. Appl. No. 16/132,156, U.S. Pat. No. 10,402,901 System and Method for Providing an Aggregation Tool, filed Sep. 14, 2018.
U.S. Appl. No. 12/705,489, filed Feb. 12, 2010, Bargoli et al.
U.S. Appl. No. 12/705,511, filed Feb. 12, 2010, Bargoli et al.
U.S. Appl. No. 60/146,074, filed Jul. 28, 1999, Tomkow.
U.S. Appl. No. 60/172,479, filed Dec. 17, 1999, Tomkow.
"A Google Health update," Google Official Blog, Sep. 15, 2010 in 4 pages, http://googleblog.blogspot.com/2010/09/google-health-update.html.
Akl, Selim G., "Digital Signatures: A Tutorial Survey," Computer, Feb. 1983, pp. 15-24.
AISG's National Underwriting Database, A-PLUS, is Now the Largest in the Industry, Business Wire, Aug. 7, 1997.
Announcing TrueProfiler, http://web.archive.org/web/20021201123646/http://www.truecredit.com/index.asp, dated Dec. 1, 2002, 2 pages.
Applied Geographic Solutions, "What is Mosaic™", as captured Feb. 15, 2004 from http://web.archive.org/web/20040215224329/http://www.appliedgeographic.com/mosaic.html in 2 pages.
"AT&T Expected to Turn Up Heat in Card Wars", American Banker, May 27, 1993, vol. 158, No. 101, pp. 3.
"Balance Transfers Offer Opportunities", Risk Credit Risk Management Report, Jan. 29, 1996, vol. 6, No. 2, pp. 2.
"Bank of America Direct Web-Based Network Adds Core Functionality to Meet Day-To-Day Treasury Needs", Business Wire, Oct. 25, 1999. pp. 2.
Bitran et al., "Mailing Decisions in Catalog Sales Industry", Management Science (JSTOR), vol. 42, No. 9, pp. 1364-1381, Sep. 1996.
Brown et al.: "ALCOD IDSS:Assisting the Australian Stock Market Surveillance Team's Review Process," Applied Artificial Intelligence Journal, Dec. 1, 1996, pp. 625-641.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Cantor, R. and Packer, F., "The Credit Rating Industry," FRBNY Quarterly Review, Summer-Fall, 1994, pp. 1-24.
ChannelWave.com, PRM Central—About PRM, http://web.archive.org/web/20000510214859/http://www.channelwave.com as printed on Jun. 21, 2006, May 2000 Archive.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Check, http://check.me/ printed Feb. 5, 2014 in 3 pages.
Chen, et al., "Modeling Credit Card 'Share of Wallet': Solving the Incomplete Information Problem", New York University: Kauffman Management Center, http://www.rhsmith.umd.edu/marketing/pdfs_docs/seminarsspr05/abstract%20-%20chen.pdf, Spring 2005, 48 pages.
"Cole Taylor Bank Chooses Integrated E-Banking/E-Payments/Reconciliation Solution From Fundtech", Business Wire, Oct. 21, 1999, pp. 2.

Corepoint Health, "The Continuity of Care Document—Changing the Landscape of Healthcare Information Exchange," Jan. 2009, pp. 9.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
Cohen et al., "Optimizer: IBM's Multi Echelon Inventory System for Managing Service Logistics", Interfaces, vol. 20, No. 1, Jan.-Feb. 1990, pp. 65-82.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davies, Donald W., "Applying the RSA Digital Signature to Electronic Mail," Computer, Feb. 1983, pp. 55-62.
Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.
"Debt Settlement: Watch Video on how to Pay Your Debt Faster", http://www.debtconsolidationcare.com/debt-settlement.html printed Jan. 9, 2013 in 6 pages.
Declaration of Paul Clark, DSc. For Inter Partes Review of U.S. Pat. No. 8,504,628 (Symantec Corporation, Petitioner), dated Jan. 15, 2014 in 76 pages.
DeGruchy, et al., "Geodemographic Profiling Benefits Stop-Smoking Service;" The British Journal of Healthcare Computing & Information Management; Feb. 2007; 24, 7; pp. 29-31.
Dillon et al., "Good Science", Marketing Research: A Magazine of Management & Applications TM, Winter 1997, vol. 9, No. 4; pp. 11.
EFunds Corporation, "Data & Decisioning: Debit Report" printed Apr. 1, 2007, http://www.efunds.com/web/industry-solutions/financial-services/frm-debit-report/htm in 1 page.
EFunds Introduces QualiFileSM, Deluxe Corporation, eFunds Press Release and Product Launch, Sep. 23, 1999, Milwaukee, WI.
Egol, Len; "What's New in Database Marketing Software," Direct, Aug. 1994, vol. 6, No. 8, pp. 39.
Elmasri et al., "Fundamentals of Database Systems, Third Edition (Excerpts)", Jun. 2000, pp. 253, 261, 268-270, 278-280, 585, 595.

(56) References Cited

OTHER PUBLICATIONS

Equifax; "White Paper: Driving Safe Growth in a Fluid Economy", http://www.equifax.com/assets/USCIS/efx_safeGrowth_wp.pdf, Oct. 2012 in 14 pages.
Equifax; "True In-Market Propensity Scores™", http://www.equifax.com/assets/USCIS/efx-00174-11-13_efx_tips.pdf, Nov. 2013 in 1 page.
Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.
Experian Announces PLUS Score; Experian Press Release dated Oct. 16, 2003; Experian Global Press Office.
Experian and AGS Select SRC to Deliver Complete Marketing Solutions; Partnership First to Marketplace with Census2000 Data. PR Newswire. New York: Mar. 21, 2001. p. 1.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian, Custom Strategist and Qualifile from Funds, 2000, in 2 pages.
Experian; "Case study: SC Telco Federal Credit Union", http://annualcreditreport.experian.com/assets/consumer-information/case-studies/sc-telco-case-study.pdf, Jun. 2011 in 2 pages.
Experian; "In the Market ModelsSM", http://www.experian.com/assets/consumer-information/product-sheets/in-the-market-models.pdf, Sep. 2013 in 2 pages.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Fickenscher, Lisa, "Merchant American Express Seeks to Mine its Data on Cardholder Spending Patterns," American Banker, vol. 162, Issue 56, Mar. 24, 1997, pp. 1-2.
"FinExtra, Basepoint Analytics Introduces Predictive Technology for Mortgage Fraud", Oct. 5, 2005, pp. 3.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Fisher, Joseph, "Access to Fair Credit Reports: Current Practices and Proposed Legislation," American Business Law Journal, Fall 1981, vol. 19, No. 3, p. 319.
"FTC Testifies: Identity Theft on the Rise", FTC News Release, Mar. 7, 2000, pp. 3.
GAO-03-661, Best Practices: Improved Knowledge of DOD Service Contracts Could Reveal Significant Savings, GAO, Jun. 2003.
Gao et al., "Exploring Temporal Effects for Location Recommendation on Location-Based Social Networks", RecSys'13, Oct. 12-16, 2013, Hong Kong, China, pp. 93-100.
Gilje, Shelby, "Keeping Tabs on Businesses That Keep Tabs on Us", NewsRoom, The Seattle Times, Section: Scene, Apr. 19, 1995, pp. 4.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Gonul, et al., "Optimal Mailing of Catalogs: A New Methodology Using Estimable Structural Dynamic Programming Models", 14 pages, Management Science, vol. 44, No. 9, Sep. 1998.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Haughton et al., "Direct Marketing Modeling with CART and CHAID", Journal of Direct Marketing, Fall 1997, vol. 11, No. 4, pp. 42-52.
Healow.com, Various screenshots from page titled "Health and Online Wellness," https://healow.com/apps/jsp/webview/index.jsp printed Aug. 19, 2013 in 4 pages.
Healthspek.com, "How Good Are We?" http://healthspek.com/how-good-are-we/ printed Jan. 21, 2014 in 2 pages.
"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.
HealthVault, "Share Health Information," https://account.healthvault.com/sharerecord.aspx, printed Feb. 20, 2013 in 2 pages.
HealthVault, "What Can you do with HealthVault?" https://www.healthvault.com/us/en/overview, http://www.eweek.com/mobile/diversinet-launches-mobihealth-wallet-for-patient-data-sharing/, printed Feb. 20, 2013 in 2 pages.
Hill, Kerry, "Identity Theft Your Social Security Numbers Provides Avenue for Thieves", NewsRoom, Wisconsin State Journal, Sep. 13, 1998, pp. 4.
Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Ideon, Credit-Card Registry that Bellyflopped this Year, Is Drawing some Bottom-Fishers, The Wall Street Journal, Aug. 21, 1995, pp. C2.
IgiHealth.com, "Orbit® PHR: Personal Health Record (PHR)," http://www.igihealth.com/consumers/orbit_phr.html, printed Jan. 21, 2014 in 2 pages.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
Inderfurth et al., "Decision Support for Spare Parts Acquisition in Post Product Life Cycle", Central European Journal of Operations Research, 2008, vol. 16, pp. 17-42.
"Industry News, New Technology Identifies Mortgage Fraud: Basepoint Analytics Launches FraudMark", Inman News, American Land Title Association, Oct. 5, 2005, pp. 1.
InsightsOne.com, "Healthcare," http://insightsone.com/healthcare-predictive-analytics/ printed Mar. 6, 2014 in 5 pages.
Instant Access to Credit Reports Now Available Online with DMS' CreditBrowser-based system also Simplifies Credit Decisioning and Offers a Central Point of Control, Business Wire, Dallas, May 23, 2000, p. 0264.

(56) References Cited

OTHER PUBLICATIONS

Internal Revenue Service Data Book 2000, Issued Aug. 2001, Revised May 2003.
International Search Report and Written Opinion for Application No. PCT/US09/37565, dated May 12, 2009.
International Search Report and Written Opinion for Application No. PCT/US2017/068340, dated Feb. 26, 2018.
Jacob et al., A Case Study of Checking Account Inquiries and Closures in Chicago, The Center for Financial Services Innovation, Nov. 2006.
"Japan's JAAI System Appraises Used Cars Over Internet", Asia Pulse, Mar. 3, 2000, p. 1.
Jost, Allen; Neural Networks, Credit World, Mar./Apr. 1993, vol. 81, No. 4, pp. 26-33.
"JPMorgan Worldwide Securities Services to Acquire Paloma's Middle and Back Office Operations," Webpage printed from http://www.jpmorgan.com on Apr. 1, 2009.
Käki, Anssi, "Forecasting in End-Of-Life Spare Parts Procurement", Master's Thesis, Helsinki University of Technology, System Analysis Laboratory, Jul. 27, 2007, pp. 84.
Kim et al., "Optimal Pricing, EOL (End of Life) Warranty, and Spare Parts Manufacturing Strategy Amid Product Transition", European Journal of Operation Research, 2008, vol. 188, pp. 723-745.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lamons, Bob, "Be Smart: Offer Inquiry Qualification Services," Marketing News, ABI/Inform Global, Nov. 6, 1995, vol. 29, No. 23, pp. 13.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, Spring 2002, pp. 12-14.
Lee, W.A.; "Experian, on Deal Hunt, Nets Identity Theft Insurer", American Banker: The Financial Services Daily, Jun. 4, 2003, New York, NY, 1 page.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock, Various Pages, www.lifelock.com/, 2007.
Longo, Tracey, "Managing Money: Your Family Finances", Kiplinger's Personal Finance Magazine, Jun. 1, 1995, vol. 49, No. 6, pp. 4.
Loshin, Intelligent Enterprise: Better Insight for Business Decisions, "Value-Added Data: Merge Ahead", Feb. 9, 2000, vol. 3, No. 3, 5 pages.
Manilla, http://www.manilla.com/how-it-works/ printed Feb. 5, 2014 in 1 page.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
MergePower, Inc., "Attribute Pro", http://web.archive.org/web/20060520135324/http://www.mergepower.com/attribute_pro.html, dated May 20, 2006 in 1 page.
MergePower, Inc., "Attribute Pro", http://web.archive.org/web/20080708204709/http://www.mergepower.com/APInfo.aspx, dated Jul. 8, 2008 in 2 pages.
MergePower, Inc., "Attribute Pro®—Credit Bureau Attributes", http://web.archive.org/web/20120307000028/http://www.mergepower.com/APInfo.aspx, dated Mar. 7, 2012 in 2 pages.
MergePower, Inc., "MergePower, Inc", http://web.archive.org/web/20060513003556/http://www.mergepower.com/, dated May 13, 2006 in 1 page.
MergePower, Inc., "MergePower, Inc", http://web.archive.org/web/20070208144622/http://www.mergepower.com/, dated Feb. 8, 2007 in 1 page.
MergePower, Inc., "MergePower, Inc", http://web.archive.org/web/20070914144019/http://www.mergepower.com/, dated Sep. 14, 2007 in 1 page.
MergePower, Inc., "MergePower, Inc", http://web.archive.org/web/20110828073054/http://www.mergepower.com/, dated Aug. 28, 2011 in 2 pages.
MERit Credit Engine™, Diagram, http://creditengine.net/diagram.htm, copyright 1997, pp. 1.
Merugu, et al.; "A New Multi-View Regression Method with an Application to Customer Wallet Estimation," The 12th International Conference on Knowledge Discovery and Data Mining, Aug. 20-23, 2006, Philadelphia, PA.
Miller, Joe, "NADA Used-Car Prices Go Online", Automotive News, Jun. 14, 1999, p. 36.
Mint.com, http://www.mint.com/how-it-works/ printed Feb. 5, 2013 in 2 pages.
Moore, John R., Jr. "Forecasting and Scheduling for Past-Model Replacement Parts", Management Science, Application Series, vol. 18, No. 4, Part 1, Dec. 1971, pp. B-200-B-213.
Muus, et al., "A Decision Theoretic Framework for Profit Maximization in Direct Marketing", Sep. 1996, pp. 20.
Mvelopes, http://www.mvelopes.com/ printed Feb. 5, 2014 in 2 pages.
"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.
"New Privista Product Provides Early Warning System to Combat Identity Theft", PR Newswire, Oct. 24, 2000, PR Newswire Association, Inc., New York.
Occasional CF Newsletter; http://www.halhelms.com/index.cfm?fuseaction-newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Otter, et al., "Direct Mail Selection by Joint Modeling of the Probability and Quantity of Response", Jun. 1997, pp. 14.
Packer, A. H., "Simulation and Adaptive Forecasting an Applied to Inventory Control", Operations Research, Jul. 1965, vol. 15, No. 4, pp. 660-679.
Pagano, et al., "Information Sharing in Credit Markets," Dec. 1993, The Journal of Finance, vol. 48, No. 5, pp. 1693-1718.
"Parse", Definition from PC Magazine Encyclopedia, http://www/pcmag.com/encyclopedia_term_0,2542,t-parse&i=48862,00.asp as downloaded Mar. 5, 2012.
Partnoy, Frank, Rethinking Regulation of Credit Rating Agencies: An Institutional Investor Perspective, Council of Institutional Investors, Apr. 2009, pp. 21.
Perlich et al., "High Quantile Modeling for Customer Wallet Estimation with Other Applications," The 13th International Conference on Knowledge Discovery and Data Mining, Aug. 12-15, 2007, San Jose, CA.
PersonalCapital.com, http://www.personalcapital.com/how-it-works printed Feb. 5, 2014 in 5 pages.
Peters, Peter-Paul, "A Spare Parts Configurator for the European Service Business" (Graduation Report), Honeywell, Industrial Service Logistic Center, Amsterdam, The Netherlands, Mar. 2000, pp. 80.

(56) References Cited

OTHER PUBLICATIONS

Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", www.gidep.org/data/dmsms/library/zell.pdf, May 1998, pp. 1-9.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
Powerforms: Declarative Client-Side for Field Validation, ISSN 1386-145x, Dec. 2000.
"PremierGuide Announces Release 3.0 of Local Search Platform", Business Wire, Mar. 4, 2004, Palo Alto, CA, p. 5574.
PrivacyGuard, http://web.archive.org/web/20110728114049/http://www.privacyguard.com/ as archived Jul. 28, 2011 in 1 page.
"Qualifying for Debt Settlement", http://www.certifieddebt.com/debt/settlement-qualifications.shtml printed Jan. 9, 2013 in 2 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
Reinartz et al., "On the Profitability of Long-Life Customers in a Noncontractual Setting: An Empirical Investigation and Implications for Marketing" Journal of Marketing, Oct. 2000, vol. 64, pp. 17-35.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, Oct. 8, 2001, p. 86.
Rosset et al., "Wallet Estimation Models", IBM TJ Watson Research Center, 2005, Yorktown Heights, NY, pp. 12.
Santarini, Michael, "Forecasts the Probable Obsolescence of Components—Module Predicts Parts Life", Electronic Engineering Times, Jan. 11, 1999, vol. 1, p. 48.
Saunders, A., "Data Goldmine," Management Today, London: Mar. 1, 2004, 6 pages.
Sawyers, Arlena, "NADA to Offer Residual Guide", Automotive News, May 22, 2000, p. 1.
Sax, Michael M., Data Collection and Privacy Protection: An International Perspective, Presentation: Managing Online Risk and Liability Conference, Aug. 31, 1999, pp. 58.
Schmittlein et al., "Customer Base Analysis: An Industrial Purchase Process Application", Marketing Science, vol. 13, No. 1, Winter 1994, pp. 41-67.
"ScoreNet® Network", FairIsaac, web.archive.org/web/20071009014242/http://www.fairisaac.com/NR/rdonlyres/AC4C2F79-4160-4E44-B0CB-5C899004879A/0/ScoreNetnetworkBR.pdf, May 2006, pp. 6.
"Settling Your Debts—Part 1 in Our Debt Settlement Series", http://www.creditinfocenter.com/debt/settle_debts.shtml printed Jan. 9, 2013 in 6 pages.
Shvachko et al., "The Hadoop Distributed File System", 2010 IEEE 26th Symposium on Mass Storage Systems and Technologies (MSST), May 3, 2010, pp. 1-10.
Singletary, Michelle, "Score One for Open Credit Ratings", The Washington Post, Washington DC, Jun. 18, 2000, 3 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Source Code Appendix attached to U.S. Appl. No. 08/845,722 by Venkatraman et al., Exhibit A, Part 1 & 2, pp. 32.
"Stagg Variables Sum Up Credit Attributes for Automated Decisions", PRWeb, May 11, 2011, pp. 2. http://www.prweb.com/releases/2011/5/prweb8404324.htm.
Stanton, T.H., "Credit Scoring and Loan Scoring as Tools for Improved Management of Federal Credit Programs", Financier, Philadelphia, Summer 1999, vol. 6, 36 pages.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Sullivan, Laurie, "Obsolete-Parts Program Thriving", EBN, Manhasset, NY, Jan. 21, 2002, Issue 1296, p. 26.
Sumner, Anthony, "Tackling the Issue of Bust-Out Fraud", Retail Banker International, Jul. 24, 2007, pp. 4.
Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Van Collie, Shimon, "The Road to Better Credit-Card Marketing," Bank Technology News, Sep. 1995, pp. 4.
Various Posts from the http://www.2p.wrox.com Forums: http://web.archive.org/web/2005045221950/http://p2p.wrox.com/topic.asp?TOPIC_ID-6513, dated Nov. 15, 2003-Oct. 7, 2004.
Verstraeten, Geert, Ph.D.; Issues in predictive modeling of individual customer behavior: Applications in targeted marketing and consumer credit scoring; Universiteit Gent (Belgium) 2005.
"WashingtonPost.com and Cars.com Launch Comprehensive Automotive Web Site for the Washington Area", PR Newswire, Oct. 22, 1998. pp. 2.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Webpage printed from http://www.magnum.net/pdfs/RapUpBrochure.pdf as printed Mar. 3, 2008.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.

(56) References Cited

OTHER PUBLICATIONS

Webster, Lee R., "Failure Rates & Life-Cycle Costs", Consulting-Specifying Engineer, Apr. 1998, vol. 23, No. 4, ABI/INFORM Global, p. 42.
Working, Holbrook, "Statistical Laws of Family Expenditure", Journal of the American Statistical Association, pp. 43-56, vol. 38, American Statistical Association, Washington, D.C., Mar. 1943.
Wyatt, Craig, "Usage Models just for Merchants," Credit Card Management, Sep. 1995, vol. 8, No. 6, pp. 4.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Yuan et al., "Time-Aware Point-of-Interest Recommendation", SIGIR'13, Jul. 28-Aug. 1, 2013, Dublin, Ireland, pp. 363-372.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.
Zoot—Decision Engine, www.zootweb.com/decision_engine.html, as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Zoot—Zoot's Hosted Environment, http://www.zootweb.com/zootasp.html as printed Mar. 3, 2008.
International Preliminary Report on Patentability in Application No. PCT/US2017/068340, dated Jul. 18, 2019.

\* cited by examiner

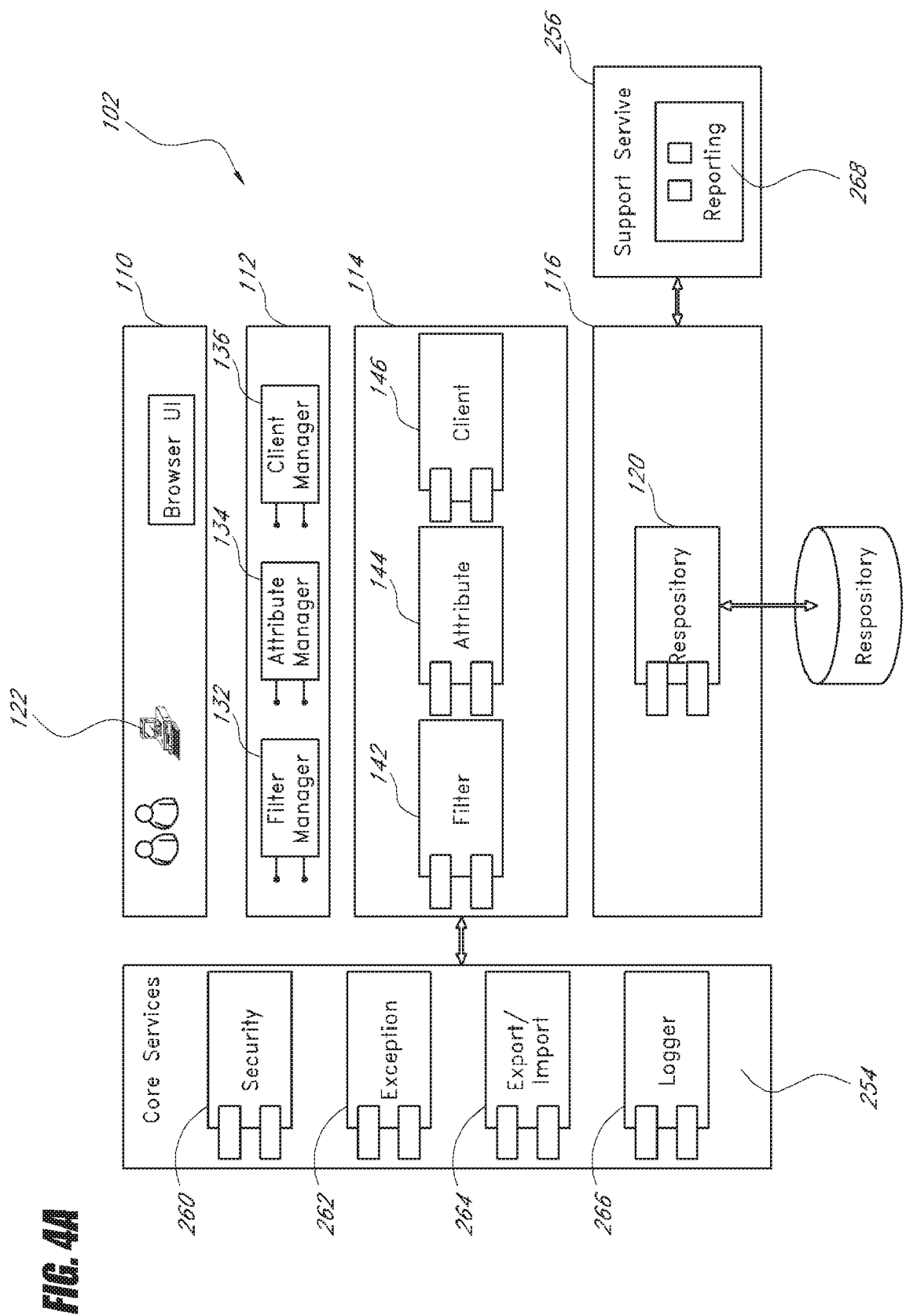

| BRANDING | | My ATB | Tools | Help | Administer Users | Log Out |
|---|---|---|---|---|---|---|
| HOME | SYSTEMS ▽ | ATTRIBUTES ▽ | | FILTERS ▽ | | TEST ▽ |

ATTRIBUTES  Client Name...edit    (new attributes)  (▶ tutorial mode)    ╱ 304

| SEARCH | 120 to 120 ATTRIBUTES | | | ‹ 1 2 3 4 5 6 › |
|---|---|---|---|---|
| Name/Keyword(s): | SHORT NAME | SYSTEM | STATUS | LOCK |
| [          ] | Short Name... | System Name | ☐ Status | ☐ Status |
| System | Short Name... | System Name, System Name | ☐ Status | ☐ Status |
| Select... ▽ | Short Name... | System Name | ☐ Status | ☐ Status |
| Format | Short Name... | System Name | ☐ Status | ☐ Status |
| Select... ▽ | Short Name... | System Name, System Name | ☐ Status | ☐ Status |
| Last Edited by: | Short Name... | System Name | ☐ Status | ☐ Status |
| Select... ▽ | Short Name... | System Name, System Name | ☐ Status | ☐ Status |
| Created: Select ▽ | Short Name... | System Name, System Name | ☐ Status | ☐ Status |
| Last Edited: Select... ▽ | Short Name... | System Name | ☐ Status | ☐ Status |
| Status: Select... ▽ | Short Name... | System Name, System Name | ☐ Status | ☐ Status |
| Locked: Select... ▽ | Short Name... | System Name, System Name | ☐ Status | ☐ Status |
| ⚠TAGG: Select... ▽ | Short Name... | System Name | ☐ Status | ☐ Status |
| | Short Name... | System Name | ☐ Status | ☐ Status |
| (Select...) | Short Name... | System Name, System Name | ☐ Status | ☐ Status |
| | Short Name... | System Name | ☐ Status | ☐ Status |
| Recently Viewed Attributes: | Short Name... | System Name, System Name | ☐ Status | ☐ Status |
| Short Name up to 30 Characters | Short Name... | System Name, System Name | ☐ Status | ☐ Status |

Show per page: [20] ▽   List View :   Set Preference| Restore Default   ‹ 1 2 3 4 5 6 ›

| Raw Data (Experian) | |
|---|---|
| Filters (Experian) | |
| Functions & Operators | |
| Add New Function | EXP |
| IF...THEN | AND |
| IF...THEN...ELSE... | OR |
| FOR...NEXT | + |
| RIGHT() | − |
| LEFT() | * |
| MIDDLE() | / |
| EMPTY | < |
| INITIALIZATION() | <= |
| DEFAULT() | > |
| MIN() | >= |
| MAX() | = |
| ABS() | <> |
| NUM() | 1/x |
| STRING() | % |
| COUNT() | Etc. |
| ROUND() | |
| ROUNDUP() | |
| ETC. | |

| Id | tr_kob | TR_INACTIVE | TR_STATUS_OPCI | TR_PAID | TR_CLOSED | tr_trade | tr_open | tr_type | tr_status | tr_spc_cr |
|----|--------|-------------|----------------|---------|-----------|----------|---------|---------|-----------|-----------|
| 1  | BC     | N           | Y              | N       | Y         | Y        | N       | 18      | 97        |           |
| 2  | FU     | N           | Y              | N       | Y         | Y        | N       | 31      | 93        |           |
| 3  | YC     | N           | Y              | N       | Y         | N        | N       | 48      | 93        |           |
| 4  | BS     | N           | Y              | N       | Y         | Y        | N       | 19      | 87        |           |
| 5  | DC     | Y           | Y              | N       | N         | Y        | N       | 07      | 05        | 31        |
| 6  | BB     | Y           | Y              | N       | N         | Y        | N       | 07      | 80        | 31        |
| 7  | FM     | Y           | Y              | N       | N         | Y        | N       | 27      | 05        | 31        |
| 8  | FF     | Y           | Y              | N       | N         | Y        | N       | 12      | 05        | 28        |
| 9  | FF     | Y           | Y              | N       | N         | Y        | N       | 12      | 05        | 28        |
| 10 | RE     | Y           | Y              | N       | N         | Y        | N       | 19      | 05        | 31        |
| 11 | FM     | Y           | Y              | N       | N         | Y        | N       | 19      | 05        | 31        |
| 12 | BB     | Y           | Y              | N       | N         | Y        | N       | 12      | 05        | 29        |
| 13 | BB     | Y           | Y              | N       | N         | Y        | N       | 12      | 05        | 29        |

FIG. 7

| BRANDING | | My ATB | Tools | Help | Administer Users | Log Out |
|---|---|---|---|---|---|---|
| HOME | SYSTEMS ▽ | ATTRIBUTES▽ | FILTERS▽ | | TEST▽ | |

CREATE A NEW CLIENT     (cancel) (save)

*Required fields

> One or more errors were detected. Please see below for more information. —362

You must enter a name for this client.

*Client Name [_____] 50

Notes [_____]

*Data Source(s)

What is this?
- ☐ Equifax
- ☐ Experian
- ☐ Transunion
- ☐ Data Source A has long name
- ☐ Data Source B
- ☐ Data Source C
- ☐ Data Source D has long name
- ☐ Data Source E
- ☐ Data Source F
- ☐ Data Source G
- ☐ Data Source H
- ☐ Data Source I
- ☐ Data Source J
- ☐ Data Source K has long name
- ☐ Data Source L

360

System 1 [_____] 50   What is this?

System 2 [_____] 50

System 3 [_____] 50

Add another system (cancel)          (save)

FIG. 8A

| BRANDING | | My ATB | Tools | Help | Administer Users | Log Out |
|---|---|---|---|---|---|---|
| HOME | SYSTEMS ▽ | ATTRIBUTES▽ | | FILTERS▽ | TEST▽ | |

CLIENTS & SYSTEMS　　　　　　　　　　( new client )　( ↻ reset )

CLIENT: CLIENT NAME　　　　　　　　　　　　( cancel )　( print )

DEPLOY SYSTEMS　　　　　　　　　　　　　　　　　( deploy )

| SYSTEM NAME | LAST DEPLOYED | STATUS | # OF ATTRIBUTES |
|---|---|---|---|
| ☐ System Name... | 4/22/07 9:41AM by UserName | ☐ Available to Deploy | 13 (edit) |
| ☐ System Name... | 1/07/07 9:41AM by UserName | ☐ Available to Deploy | 22 (edit) |
| ☐ System Name... | NA | ☐ Available to Deploy | 2 (edit) |
| System Name... | NA | ☐ No Attributes | 0 (edit) |
| System Name... | 10/25/06 9:41AM by UserName | ☐ Syntax Errors | 4 (edit) |
| ☐ System Name... | NA | ☐ Available to Deploy | 4 (edit) |
| ☐ System Name... | 5/30/07 9:41AM by UserName | ☐ Available to Deploy | 22 (edit) |
| ☐ System Name... | 4/22/07 9:41AM by UserName | ☐ Available to Deploy | 2 (edit) |
| ☐ System Name... | 10/25/06 9:41AM by UserName | ☐ Available to Deploy | 4 (edit) |
| ☐ System Name... | 4/22/07 9:41AM by UserName | ☐ Available to Deploy | 13 (edit) |

Select All　De-select All ( cancel )　　　　　　　　　　　　　　　　　　　　　　　( deploy )

| BRANDING | | My ATB | Tools | Help | Administer | Users | Log Out |
| --- | --- | --- | --- | --- | --- | --- | --- |
| HOME | SYSTEMS ▽ | ATTRIBUTES ▽ | | FILTERS ▽ | | TEST ▽ | |

TOOLS

Overview 200 of 200 DATA SOURCES  `< |1|2|3|4|5|6| >`

[_____] (search)

Data Sources

Reports

Import

Export

| SHORT NAME ▽ | Long Name | LAST MODIFIED |
| --- | --- | --- |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |

`< |1|2|3|4|5|6| >`

386

EDIT DATA SOURCE: SHORTNAME   (cancel)  (print)  (save)

*Required fields

*Short Name:  [DATA_SOURCE_01]  30  What is this?

*Long Name:  [New data source sed pede vel orci auctor consequat]  5  What is this?

Description  [Loren ipsum dolor sit amet, consectetuer adipiscing elit. Donec convallis, leo in condimentum cursus, nunc justo interdum leo, vitae porttitor odio lorem eget risus. Nullam rutrum, nisi at pellentesque consequat, orci eros auctor justo, eu volupat eros lorem vel sapien.]  124

388

*File Name:  [Users selects name and location of data source file]  (browse)

(cancel)                                                              (save)

FIG. 9A

| BRANDING | | My ATB \| Tools \| Help \| Administer Users \| Log Out | | |
|---|---|---|---|---|
| HOME | SYSTEMS ▽ | ATTRIBUTES▽ | FILTERS▽ | TEST▽ |

TOOLS

Overview

EXPORT SYSTEMS  <|1|2|3|4|5|6|>

Data Sources

Select a Client: [Bank of America]   What is this?

Reports

Import

Export

| SHORT NAME ▽ | Long Name | STATUS | # OF ATTRIBUTES |
|---|---|---|---|
| ☑ System Name | 4/22/07 9:41AM by UserName | Ready to Export | 13 (edit) |
| ☑ System Name | 1/07/07 9:41AM by UserName | Ready to Export | 22 (edit) |
| System Name | N/A | No Attributes | 0 (edit) |
| System Name | N/A | Syntax Errors | 10 (edit) |
| ☑ System Name | 10/25/06 9:41 by UserName | Ready to Export | 4 (edit) |
| ☐ System Name | N/A | Ready to Export | 4 (edit) |
| ☐ System Name | 5/30/07 9:41AM by UserName | Ready to Export | 22 (edit) |
| ☐ System Name | 4/22/07 9:41AM by UserName | Ready to Export | 2 (edit) |
| ☐ System Name | 10/25/06 9:41AM by UserName | Ready to Export | 4 (edit) |
| ☐ System Name | 4/22/07 9:41AM by UserName | Ready to Export | 13 (edit) |
| ☐ System Name | N/A | Ready to Export | 4 (edit) |
| ☐ System Name | 5/30/07 9:41AM by UserName | Ready to Export | 22 (edit) |
| ☐ System Name | 4/22/07 9:41AM by UserName | Ready to Export | 2 (edit) |
| ☐ System Name | 10/25/06 9:41AM by UserName | Ready to Export | 4 (edit) |
| ☐ System Name | 4/22/07 9:41AM by UserName | Ready to Export | 13 (edit) |

Select All   De-select All (cancel)                    390                    (next)

FIG. 9B

SYSTEM AND METHOD FOR PROVIDING AN AGGREGATION TOOL

CROSS-REFERENCE TO RELATED APPLICATIONS

This application is a continuation of U.S. patent application Ser. No. 16/132,156 filed Sep. 14, 2018, entitled "SYSTEM AND METHOD FOR PROVIDING AN AGGREGATION TOOL," which is a continuation of U.S. patent application Ser. No. 15/464,089 filed Mar. 20, 2017, and which issued as U.S. patent Ser. No. 10,078,868, entitled "SYSTEM AND METHOD FOR PROVIDING AN AGGREGATION TOOL," which is a continuation of U.S. patent application Ser. No. 14/091,174 filed on Nov. 26, 2013, and which issued as U.S. Pat. No. 9,619,579, entitled "SYSTEM AND METHOD FOR PROVIDING AN AGGREGATION TOOL," which is a continuation of U.S. patent application Ser. No. 12/022,954 filed on Jan. 30, 2008, and which issued as U.S. Pat. No. 8,606,666, entitled "SYSTEM AND METHOD FOR PROVIDING AN AGGREGATION TOOL," which claims the benefit of priority under 35 U.S.C. § 119(e) of U.S. Provisional Patent Application No. 60/887,523 filed on Jan. 31, 2007, the entire contents of which are each hereby incorporated by reference in their entireties herein and should be considered a part of this application. All publications and patent applications mentioned in this specification are herein incorporated by reference in their entirety and made a part of this specification to the same extent as if each individual publication or patent application was specifically and individually indicated to be wholly incorporated by reference.

BACKGROUND OF THE INVENTION

Field of the Invention

The disclosure relates generally to the field of scoring and prediction and to tools to improve the flexibility and efficiency in generating and evaluating aggregated attributes.

Description of the Related Art

There exists significant interest in information indicative of the relative financial risk or profitability of potential business transactions with individuals or other entities. For example, a lending institution is interested in the relative likelihood of a loan recipient timely and reliably making mutually agreed loan payments. An insurance company is interested in the relative likelihood of claims arising from an existing or potential client. Such predictive information is a factor in deciding whether to engage in a particular business transaction and/or the terms under which a transaction takes place.

A large variety of public records and privately developed databases can be utilized to inform such risk/benefit determinations. For example, credit reporting agencies (CRAs) collect and maintain information on a person's individual credit history. This information can include a total credit line on one or more accounts, current credit balance, credit ratios, satisfactorily paid accounts, any late payments or delinquencies, depth of credit history, total outstanding credit balance, and/or records of recent and/or historical inquiries into the person's credit. Governmental motor vehicle agencies generally maintain records of any vehicle code violations by a person as well as histories of reported accidents. Courts will generally maintain records of pending or disposed cases associated with a person, such as small claims filings, bankruptcy filings, and/or any criminal charges. Similar information also exists for large and small businesses, such as length of the business's existence, reported income, profits, outstanding accounts receivable, payment history, market share, and so forth.

The extensive amount of data available for any given person or entity makes the task of evaluating a business decision regarding the person or entity very difficult. Accordingly, such raw data is frequently processed to facilitate more convenient and rapid financial decisions. For example, a person's raw financial data can be processed to produce a "score" indicative of their relative credit worthiness. Such a score can be utilized in decisions to extend the person or entity further credit and/or as a factor in determining an interest rate to be charged. The evaluation of the relative risk/benefit of a given decision is even more complex when considering multiple persons simultaneously, such as spouses, partnerships, sole proprietorships, joint ventures, LLCs or other entities. When considering multiple persons, raw data from multiple sources about each of the individuals may need to be evaluated.

Attributes can be used to calculate various types of scores and in many instances may be used on their own to guide business decisions as well. Attributes can be aggregated to target various aspects of credit histories, bankruptcy data, and other types of non-credit-based data. For example, a simple attribute could be "consumers who have opened a new credit line in the last 12 months." The results of the attribute would be a set of consumers who meets both the criteria of having opened a new credit line and having done so in the last 12 months. Therefore, attributes are important in facilitating the use of raw data for a variety of decisions that financial institutions and other entities may need to make.

SUMMARY OF THE DISCLOSURE

Embodiments of the present invention provide systems and methods for creating, managing, and calculating attributes and filters for multiple data sources. One embodiment is an attribute toolbox (ATB) architecture that comprises an ATB user interface (ATB UI) and an ATB engine system.

One embodiment of the present invention is a system for creating and using credit data attributes, comprising an attribute repository for storing a plurality of credit data attributes, a first application server executing a platform-independent user interface application, a credit data repository, and a second application server executing an attribute calculation engine system, wherein the attribute calculation engine system is configured to retrieve credit data from the credit data repository and performs calculations on the credit data in accordance to the attributes in a deployment package generated by the user interface application. In one embodiment, the user interface application further comprises a development interface for editing credit data attributes, wherein the development interface is configured to retrieve the credit data attributes from the attribute repository for editing and return edited credit data attributes or newly created credit data attributes for saving in the attribute repository, a validation interface for testing credit data attributes, wherein the user interface application is configured to execute a validation engine to calculate credit data attributes on test credit data and display the results on the validation interface, and a management interface for managing the deployment of the credit data attributes, wherein the credit data attributes are saved into a deployment package.

Another embodiment is a system for creating of data attributes, comprising an attribute repository and a user interface application configured to receive a plurality of requests from users. The attribute repository stores a plurality of data attribute elements, including attributes, filters, functions, operators, and data definitions. The user interface application further comprises a development interface for editing attribute elements, wherein the development interface is configured to retrieve attribute elements from the attribute repository for editing and return edited attribute elements or newly created attribute elements for saving in the attribute repository, and a validation interface for testing data attributes, wherein the user interface application is configured to execute a validation processing engine to calculate data attributes on test credit data and display the calculation results of the individual attribute elements on the validation interface.

One embodiment is a system for calculating credit data attributes, comprising at least one credit data repository, a first plurality of application servers executing a plurality of attribute calculation engines, a second plurality of application servers executing a plurality of data access engines, wherein the data access engines are configured to access data from the at least one credit data repository, and a third plurality of application servers executing a plurality of façade applications, wherein the façade applications are configured to receive a plurality of attribute calculation requests from a plurality of calling applications, send corresponding requests to the attribute calculation engines and data access engines, and return calculation results from the attribute calculation engines to the calling applications.

One embodiment is a method for building attributes for data from multiple data sources, comprising the steps of defining a plurality of filters, wherein each filter takes into account the format of a data source among a plurality of data sources, defining a plurality of data source-independent attributes, wherein the attributes operate on data selected by the plurality of filters, and creating a deployment package based on the plurality of attributes.

One embodiment is a method for calculating data scores based on data from multiple data sources, comprising the steps of selecting a plurality of data sets from a plurality of data sources, wherein each of the plurality of data sources stores its data in a different format, defining a plurality sets of filters, wherein each set of filters takes into account the format of each of the plurality of data sources, defining a plurality of data source-independent attributes, extracting a subset of data from each of the selected data sets in accordance to the filters, calculating the attributes based on the subset of data, and aggregating the results obtained from the step of calculating to create data scores.

One embodiment of the present invention is a system for creating and using data attributes, comprising an attribute repository for storing a plurality of data attributes, a first application server executing a platform-independent user interface application, a data repository, and a second application server executing an attribute calculation engine system, wherein the attribute calculation engine system is configured to retrieve data from the data repository and performs calculations on the data in accordance to the attributes in a deployment package generated by the user interface application. In one embodiment, the user interface application further comprises a development interface for editing data attributes, wherein the development interface is configured to retrieve the data attributes from the attribute repository for editing and return edited data attributes or newly created data attributes for saving in the attribute repository, a validation interface for testing data attributes, wherein the user interface application is configured to execute a validation engine to calculate data attributes on test data and display the results on the validation interface, and a management interface for managing the deployment of the data attributes, wherein the data attributes are saved into a deployment package.

BRIEF DESCRIPTION OF THE DRAWINGS

Specific embodiments of the invention will now be described with reference to the following drawings, which are intended to illustrate embodiments of the invention, but not limit the invention:

FIG. 4A is a schematic diagram showing the implementation of the ATB UI according to one embodiment;

FIG. 5A is an example computer screen showing how attributes are located and managed in the ATB UI according to one embodiment;

FIG. 5C is an example computer screen showing how functions and operators can be added to attributes according to one embodiment;

FIG. 6C is a computer screen showing a search and browse interface displaying how filters are used according to one embodiment;

FIG. 7 is an example computer screen of the validation interface showing the results of the validation engine according to one embodiment;

FIG. 8A is an example computer screen showing how a client system can be created in the ATB UI according to one embodiment;

FIG. 8C is an example computer screen showing how multiple clients and systems are managed in the ATB UI according to one embodiment;

FIG. 9A is an example computer screen showing how multiple data sources are managed in the ATB UI according to one embodiment; and FIG. 9B is an example computer screen showing show attributes and filters can be exported according to one embodiment.

DETAILED DESCRIPTION OF PREFERRED EMBODIMENTS

Figure 1:
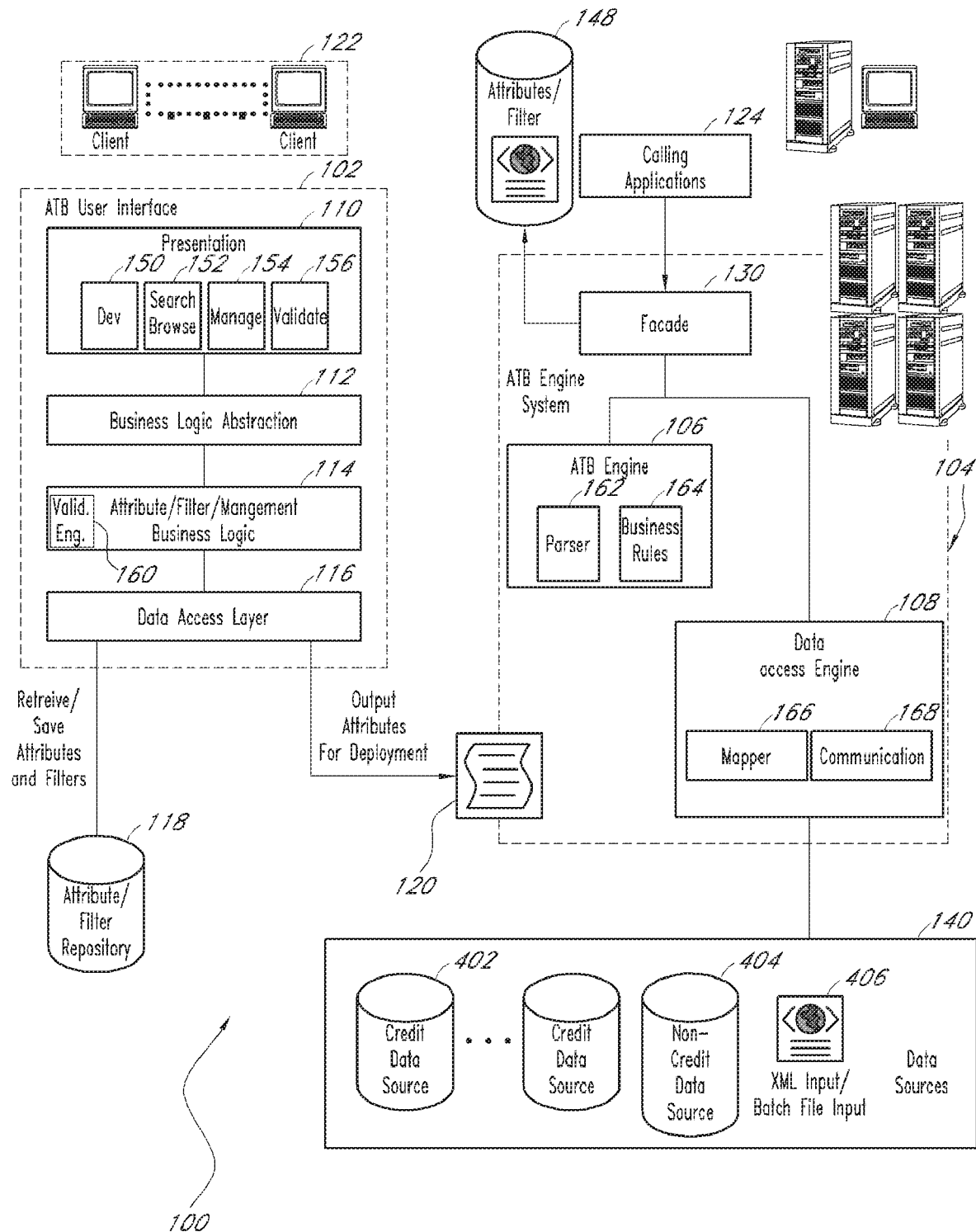
FIG. 1 illustrates the architecture of the ATB architecture according to an embodiment.

Embodiments of the ATB UI system architecture solve many problems associated with developing, managing, and deploying attributes. First, many common aggregated attributes are often complex, referencing other attributes as well as filters that are data format dependent. The filters themselves have to be coded to access specific fields within a data source. For example, since each of the main CRAs in the United States maintains data in a different format, a separate filter is often used for each CRA. Therefore, the development of filters and attributes is often a tedious process and syntax errors frequently occur. Those skilled in the art will recognize that attributes can be developed for non-credit data sources, and the challenge of accounting for the individual formats of non-credit data sources exist as well. In one embodiment, the ATB UI includes a development interface that allows for filters and attributes to be moved via the UI, for example, into a coding area in which an attribute or a filter is being edited. In another embodiment, the ATB UI provides a filter development interface that presents data fields to the user. The interface simplifies the task of developing filters for multiple data sources that have different formats by presenting the data fields of the data sources in a graphical user interface. The fields can be moved into coding area as well, ensuring that proper data field references are included.

Second, the development of efficient and accurate attributes relies on extensive testing on raw data and constant revisions are made based on test results. Attributes often reference other attribute elements in a long chain of dependencies, including other attributes that may in turn reference numerous filters. For example, in developing an attribute that uses five other attributes, a developer may have to run numerous tests in order to arrive at the proper weight that should be accorded to each of the five attributes. In one embodiment, the ATB UI includes a validation interface that advantageously allows the user to see results returned by each attribute element that is referenced by the attribute that is currently being tested. One embodiment displays the results of each filter and each attribute that is referenced by the attribute that is being validated. This enables the user to quickly determining any errors or performance problems hidden in the chain of dependencies. The user can, for example, quickly determine that a filter is selecting a wrong field or that an attribute calculation is returning erroneous or undesirable results. The interface is particularly helpful in the development of aggregation attributes, which often reference a large number attributes and filters. The ability to trace the results of the individual elements is invaluable to the development of such attributes.

Third, institutions often require the use hundreds of attributes in multiple combinations to handle complex analysis and modeling on credit-based and non-credit based data. As a result, both the creation and maintenance of filters and attributes can require significant time and effort. Finally, the ability to effectively calculate attributes and scores on data from multiple data sources also presents significant challenges as well.

Embodiments of the ATB UI and ATB engine system architectures facilitate the management of the attributes and remove some of the difficulties that come with having to manually configure the deployment of attributes in system files. In one embodiment, the ATB UI allows users to associate groups of attributes into a system through a graphical user interface. The ATB UI also provides a comprehensive view of how attributes are deployed in various systems. Users can quickly and easily view the dependencies between attributes and the associated systems and determine how editing an attribute will affect the systems in their deployment scheme. In one embodiment, upon user request the ATB UI will automatically output a single deployment package including all of the user's systems, along with the proper associations of attributes, filters, and other configuration information. The deployment package can then be used in the ATB engine system, a system that performs attribute calculations.

In one embodiment, the ATB engine system is configured to dynamically access multiple data sources and automatically performs attribute calculations based on the attributes included in the deployment package. In another embodiment, the ATB engine system can calculate the attributes on credit data for a related set of individuals or entities. In one embodiment, both the ATB UI and the ATB engine system are implemented in a component-based architecture with a high degree of flexibility, maintainability, and scalability. In one embodiment, multiple components can be hosted in a single environment. In another embodiment, the components can be distributed across a network with a load balancing server to manage and distribute requests among the components.

FIG. 1 depicts the architecture of an embodiment of the present invention. Attribute Toolbox (ATB) architecture 100 includes two main components: an ATB User Interface (ATB UI) module 102 and an ATB engine system 104. The ATB UI 102 presents a comprehensive user interface through which users can view, edit, validate, and simulate filters and attributes. The ATB engine system 104 takes the attributes created by the ATB UI 102, fetches data from the appropriate data sources, and performs calculations on the fetched data based on those attributes.

ATB UI

As shown in FIG. 1, the ATB UI 102 includes a presentation component 110, a business logic abstraction 112, an attribute/filter management business logic 114, and a data access layer 116.

Attribute Development

The presentation component 110 presents various user interfaces to assist in the development of filters and attributes and the management of their deployment to various systems. In one embodiment, the presentation component 110 further comprises filter and attribute development interfaces 150, a search/browse interface 152, a management interface 154, and a validation interface 156. The filter and attribute development interfaces 150 enable users to drag and drop existing data definitions, filters, functions, and attributes into a coding area and thereby substantially reducing the time and effort required to locate the proper elements that need to be added into new filters and attributes. The search interface 152 enables user to search for and browse filters, attributes, and clients/systems. The management interface 154 allows user to configure clients and systems and provides an interface through which attributes can be associated to systems for deployment. These user interfaces will be further described in conjunction with FIGS. 5A-9B. In one embodiment, the ATB UI 102 accepts requests from client computers 122 and responds by presenting the appropriate user interfaces to the client computers 122.

These user interfaces access objects and methods within the business logic abstraction 112 layer, which is an abstraction layer of the attribute/filter management business logic 114. Hence, any future changes in the implementation in the attribute/filter management business logic 114 will not necessarily necessitate recoding or reconfiguring the presentation component 110. The ATB UI 102 retrieves attributes and filters from the attribute/filter repository 118 through the data access layer 116. Likewise, new or edited filters and attributes are saved back to the repository 118. The attributes can be standardized attributes such as standard aggregation (STAGG) attributes created by Experian, custom-made attributes, or both.

In one embodiment, the repository 118 implements a version control feature so that users of the ATB UI 102 can retrieve previous versions of attributes and filters. Furthermore, the ATB UI 102 provides a locking mechanism by which users can lock the attributes and filters that they are currently editing to prevent other users from changing them. The locking mechanism and the version control feature enable multiple users to collaborate on the development of attributes and filters.

In addition, one embodiment of the ATB UI 102 has user access control. For example, some users may be given rights to execute but not view attributes. Other users may have full rights to view and edit the attributes. In one embodiment, the user access rights are controlled by special serial numbers or passcodes, though it is recognized that a variety of security procedures and methods may be used. A user presents the proper serial number or passcode in order to view and edit attributes. The modularity of various interfaces, in addition to the user control feature of ATB UI 102, allows users with various roles to collaborate on a project. For example, developers of attributes and filters may be granted full rights to view and modify attributes and filters, while business analysts may be granted limited rights to deploy the attributes to various systems. In another example, a company that specializes in developing attributes and filters may have full access rights while its customers who purchase the attributes and filters may be given limited rights to use but not view the attributes and filters.

Testing, Validation and Simulation

Figure 2:
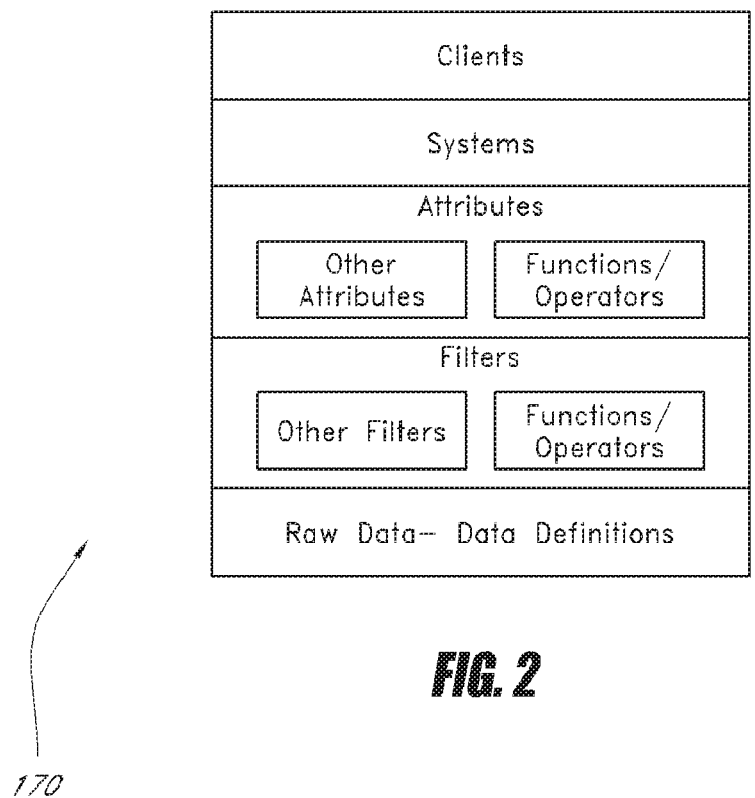
FIG. 2 illustrates the hierarchy and the dependencies of systems, clients, attributes, filters, functions and raw data as used in one embodiment.

One main difficulty with attribute and filter development is the significant effort required for validation. Often attribute and filter developers have to test the attributes and filters on sample data and modify them repeatedly to improve performance and accuracy. In addition to this iterative process, developers have to account for the large number of dependencies that can potentially be in any attributes and filters. FIG. 2 illustrates the potential dependencies as used in one embodiment. Hierarchy 170 shows that clients are dependent on systems, which in turn are dependent on attributes. An example client may be a credit card company, and the company may have a number of systems for its credit card products. For example, one system may be used to screen commercial card applicants and another may be used to screen consumer card applicants. As such, the two systems have different attributes because the screening criteria for these two groups of applicants are different.

Returning to the hierarchy, attributes are further dependent on filters, which in turn are dependent on the raw data definitions. This is because attributes are data-independent and filters are data dependent. In one embodiment, a filter must be defined for each data source. As shown in the hierarchy 170, each filter can also reference other filters, functions and data definitions. Each attribute, in turn, can reference a number of filters, functions and other attributes. Thus, an error in a data definition in a single filter can adversely affect all filters that reference that single filter, and in turn all attributes that reference those affected filters will be affected as well, and so on.

One embodiment of the ATB UI 102 addresses this difficulty by providing a validation engine 160 that allows for dependency tracing. In one example, an attribute A includes three other attributes B, C, D, and attributes B, C and D each additionally has three filters B1, B2, B3 and so on. When the user decides to test attribute A on a test data set in the validation engine 160, the validation interface 156 shows the user the results of applying filters B1, B2, B3, C1, C2, C3, D1, D2, and D3 to the sample data, as well as the results of calculating attributes B, C, and D. In addition, the validation interface 156 displays the raw data used in testing. Because each result in the chain of dependency for attribute A is displayed, the user can quickly locate any problem within the chain of dependency. For example, the user can see that attribute B is returning undesirable results, determine that filter B1 is incorrect, and adjust filter B1 to correct the problem. Because the dependencies can often be far more numerous and complex than this simple example, the validation interface 156 provides a powerful tracing tool for developers of attributes and filters for multiple data sources.

In addition to the validation engine 160, embodiments also provide a simulation configuration wherein the user can utilize the ATB UI 102 to simulate the performance of their filters and attributes to see how they affect attribute and score calculations. In one embodiment, the ATB UI 102 provides an interface by which a user may connect a custom application so the user may simulate the attributes and filters created in the ATB UI 102 in the custom application.

ATB Viewer

Embodiments of the invention also include an ATB Viewer component. The ATB Viewer is a user interface that allows users to "view" parsed raw data, calculated filter or attribute results. Attributes and filters can be created and generated and the results can be stored. The results can further be returned to a custom/calling application selected by the user. If the user wishes to view the results immediately, he/she can access the ATB Viewer to have a general formatted overview of the results for a specific test case.

Management and Deployment

The ATB UI 102 allows users to manage the collections of filters and attributes that are slated for deployment in the ATB engine system 104. Users can quickly create attributes and associate a group of attributes for deployment. For example, a bank user may create twenty attributes for its credit card operations and another fifty attributes for its home loan operations. The bank may then associate the twenty attributes to a "Credit Cards" system and the fifty attributes to a "Home Loans" systems by using the ATB UI 102. The ATB UI 102 then outputs a deployment package 120 to be used by the ATB UI engine system 104, which performs calculations based on these associated attributes included with the deployment package 120. In one embodiment, the deployment package 120 is generated with the proper dependencies among the attributes and filters. Furthermore, the deployment package 120 can accommodate multiple systems, each with its own associated attributes. This one-step deployment function of this embodiment substantially eliminates the cost of having to code the dependencies of the attributes manually and enables rapid deployment of multiple systems with a single request sent to the ATB UI 102.

ATB Engine System

The ATB engine system 104 retrieves and parses raw data, calculates attributes, and returns results. In the illustrated embodiment, the ATB engine system 104 comprises an ATB engine 106 and a data access engine 108. In other embodiments, they can be combined into one engine. The ATB engine 106 calculates attributes or scores using data received from the data access engine 108. In one embodiment, the ATB engine 106 comprises a parser 162, which reads and parses data. In other embodiments, during calculation, the ATB engine 106 reads instructions in a manually created file or a deployment file produced by the ATB UI 102. The ATB engine 106 then instructs a business rules component 164, which performs the actual calculations.

In one embodiment, the data access engine 108 accesses the external data source(s) 140 or reads the data from one or several files (for example, an automatic response format (ARF) file), parses the data, and sends it to the ATB engine 106 for calculation. The data access engine 108 comprises a mapper 166 and a communication module 168. The mapper 166 handles the mapping of data fields in data sources 140 to objects within ATB engine system 104. The communication module 168 handles the tasks of communicating with various data sources 140. Because data access engine 108 accepts a wide variety of data input, it can be configured to access data from credit data sources 402 as well as data from non-credit data sources 404, such as a local data source 406. In one embodiment, the local data source 406 is a batch XML input. For example, a bank running an instance of the ATB engine 104 may configure the ATB engine 104 to perform attribute calculations on data from a credit bureau, a third-party data source, and/or its own internal customer data. In one embodiment, the results of the calculations are sent to a repository 148 so the calling application 124 may access them.

Because the ATB engine system 104 can handle multiple data sources, it can dynamically calculate the attributes across data sources as needed. Embodiments of the ATB engine system 104 can be configured to automatically calculate attributes across multiple data sources, whether in response to requests from a plurality of calling applications or a large volume of batch requests from batch files. The ability to handle calculations across multiple data sources in accordance to the incoming requests greatly assist in the evaluation of the relative risk/benefit of a given financial decision that involve multiple persons at the same time, such as spouses, partnerships, sole proprietorships, joint ventures, LLCs or other entities. Thus, unlike prior systems, users of the ATB engine system 104 will not have to access the data sources individually and perform attribute calculation for each source and then combine the results of their calculations. Similarly, the ATB engine system 104 will not have to perform an analysis on individuals separately and then combine the results.

Profile

Embodiments of the ATB engine system 104 additionally includes a profile component. In one embodiment the profile component is part of the façade 130. A profile provides the ability to handle simple work flows. For example, one work flow may be a decision of call one data source versus another that depends on the results coming from a previous service request. For example, one profile can include instructions to the ATB engine system 104 to access an alternative data source in case a first request does not return the desired data. The profile workflow logic can include a variety of instructions and requests that can be executed based on the occurrence or non-occurrence of various conditions. Embodiments of ATB engine system include profiles that can handle roll-over logic, ZIP code tables and any other type of logic driven by one or several attribute calculations.

ATB UI Architecture

Figure 3A:
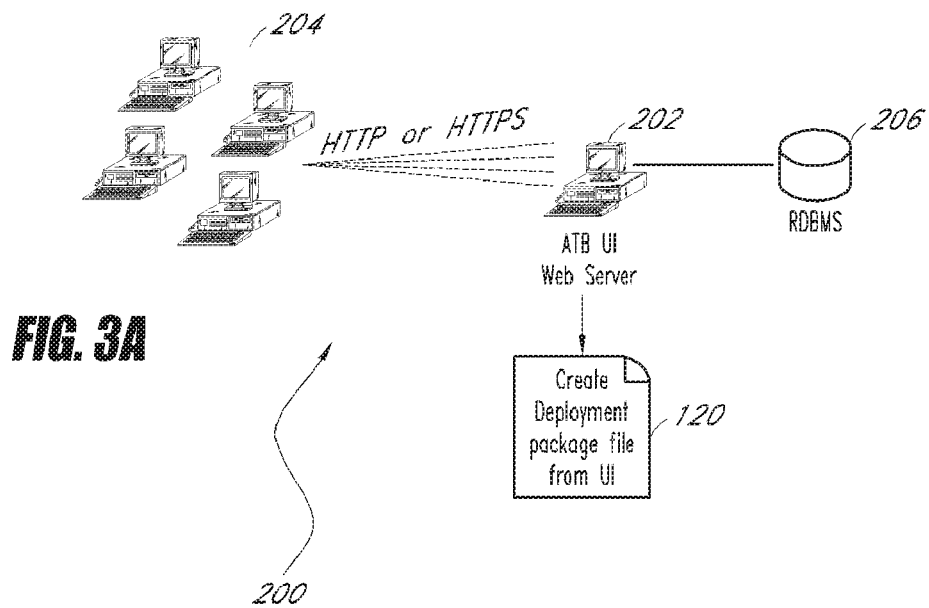
FIG. 3A illustrates an example deployment configuration of the ATB UI according to an embodiment.

FIG. 3A depicts an embodiment of the ATB UI web server architecture. The illustrated ATB UI architecture 200 includes an ATB UI web server 202 configured to receive requests from a plurality of workstations or other remote computing devices 204. In one embodiment, workstations or remote computing devices 204 send requests and receive responses via the HTTP or HTTPS protocols, and use web browsers to solicit inputs and display the information to the end users. For example, an end user may be a bank that regularly extends credit to its customers. The bank may be able to use its computers to remotely interact with the ATB UI web server 202 in order to view, edit, validate, and test its own attributes and filters stored in relational databases 206. In one embodiment, the ATB UI web server 202 is a self-contained Ruby on Rails application that acts as a web server. It communicates via the HTTP or HTTPS protocol in one embodiment. Syntax checking of attribute codes is accomplished through java-script on the client computers. It is recognized that other applications, protocols, and languages may be used.

ATB Engine Architecture

Figure 3B:
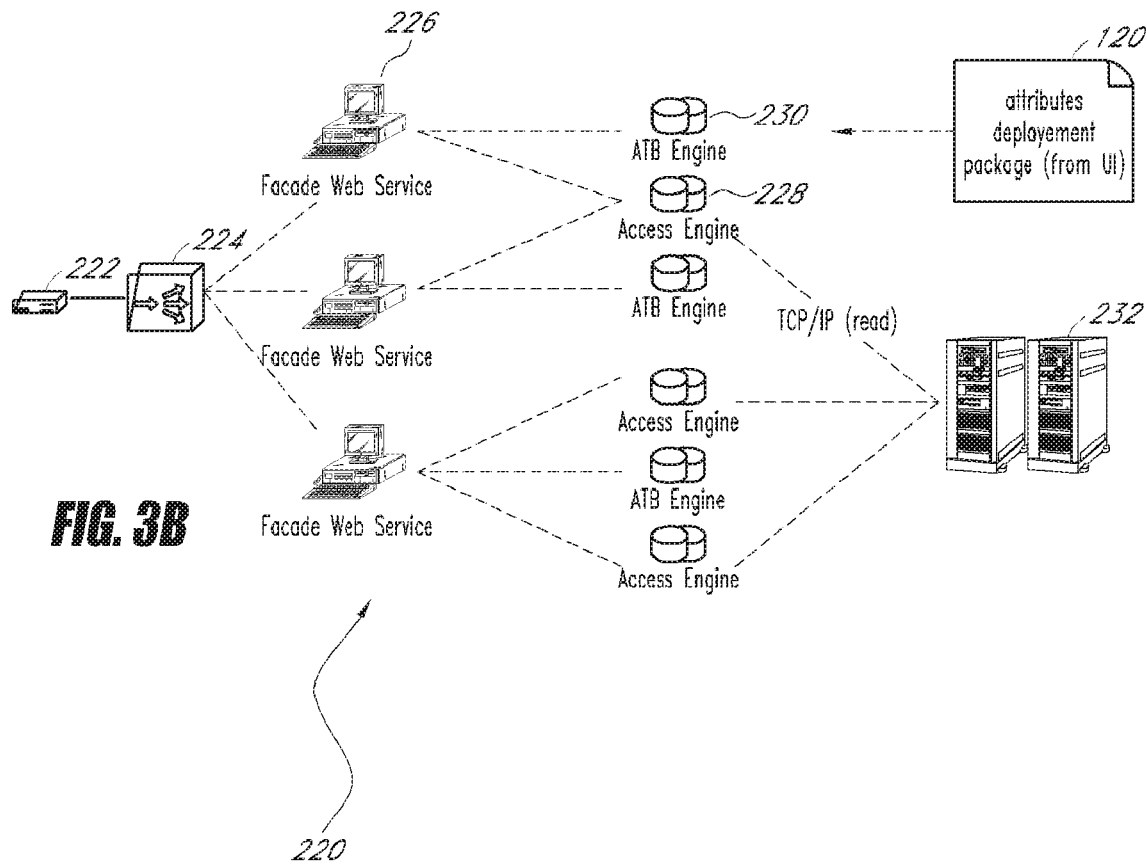
FIG. 3B illustrates an example deployment configuration of the ATB engine system according to an embodiment.

FIG. 3B illustrates an embodiment of the ATB engine system architecture. The illustrated ATB engine system architecture 220 includes a calling application 222, a load balancer 224, one or more façade web services 226, data access engines 228, ATB engines 230, and a data storage 232. In one embodiment, the calling application 222 is an application that sends calculation requests to the load balancer 224. In other embodiments, the calling application 222 directly sends requests to the façade web service 226. These requests include requests to calculate attributes and scores. For example, a bank may have a calling application that sends a request to calculate the number of customers who have the attribute of recently opening a credit line within the last twelve months. In one embodiment, the calling application is a custom-coded application. For example, a mortgage company may have a custom-coded application to process its loan applicants. In another embodiment, the calling application is a commercially available application such as Transact by Experian Decision Analytics. It is recognized that other applications may be used.

In one embodiment, the load balancer 224 receives requests from a plurality of calling applications 222 and distributes those requests to a plurality of the façade web services 226 in order to improve the efficiency of the overall architecture. Each façade web service 226 publishes objects and methods available for attribute calculation. Upon receipt of an incoming request from the calling application 224, the façade web service 226 initiates the appropriate remote procedural calls (RPC) over the TCP/IP protocol to either the data access engine 228 or the ATB engine 230. For example, the façade web service 226 may initiate a first RPC to the data access engine 228 to retrieve the requested data from the data storage 232 and then initiate a second RPC to the ATB engine 230 for calculation. The ATB engine 230 then calculates the results by applying attributes within the deployment package 120 to the retrieved data sets. In one embodiment, a user can use the ATB UI 102 to create the deployment package 120. The final results are sent back to the calling application 222. In the recently opened credit line example mentioned above, the results would be a list of customers who have opened a recent credit line.

The configuration depicted in FIGS. 3A and 3B is for illustrative purposes only and those skilled in the art will recognize that any number of components of the architecture can be used. In one embodiment, the architecture is designed to be scalable. For example, although not depicted, a plurality of calling applications and a plurality of credit bureau data sources can be used in the architecture. Moreover, the components can reside in a single computer environment or distributed across multiple computer environments.

FIG. 4A provides a more detailed depiction of the architecture of the ATB UI 102 according to one embodiment. As previously shown in FIG. 1, client computers 122 access the ATB UI 102 over one or more communication networks. The presentation component 110 presents a user interface by which users can interact with the ATB UI 102. Except for the web browsers located on client computers 122, no installed code base of ATB UI needs to reside on client computers 122. Communications from the browser interface to the presentation component 110 occur through URL navigation or HTTP requests.

The business logic abstraction layer 112 is an abstraction layer of the attribute/filter management business logic 114. The abstraction layer 110 further comprises a filter manager 132, an attribute manager 134, and a client manager 136. These managers present objects, systems and methods for viewing, editing, and managing filters, attributes, and systems to which the filters and attributes will employ. The managers have their corresponding counterparts within the business logic 114, namely, a filter business component 142, an attribute business component 144, and a client business component 146. The three business components work with a repository object 120 within the data access layer 116 for transactions involving the repository 118. In this example embodiment, the repository 118 comprises a SQLite database server, but those skilled in the art will recognized that other database servers such as Oracle, mySQL, Microsoft SQL Server, and IBM DB2 can be used as well.

The abstraction layer 112 serves as a liaison between the presentation component 110 and the business logic 114. The abstraction layer 112 also provides security enforcement functions in one embodiment. For example, it ensures that attributes are only displayed for the users who have the proper access rights to view them. In one embodiment, the abstraction layer 112, the business logic 114 and the data access layer 116 are implemented in a Ruby on Rails environment, which has the advantages of providing ease of maintenance and a modular programming construct, though other environments may be used.

As shown in FIG. 4A, the ATB UI 102 further includes a core services component 254 and a support service component 256. In one embodiment, the core services component 254 is a Rails framework comprising a security component 260, an exception component 262, an export/import component 264, and a logger component 266. The security component 260 provides the logic for security enforcement, which limits access to the attributes and filters to those users who have the proper levels of access rights. The exception component 262 handles exceptions generated by any component within the ATB UI 102. The export/import component 264 is a data interchange service that supports and provides the capability to export and import ATB entities (for example, attributes) from and into the ATB UI 102. The logger component 266 is served by the Ruby log4r library in one embodiment. It provides the functionality to publish messages to external log stores and to control the type and volume of data logged. The support service component 256 comprises a reporting component 268, which provides a set of pre-defined reports that can be run. In one embodiment, the generated reports are templates for specification documents and include attributes and related results.

Figure 4B:
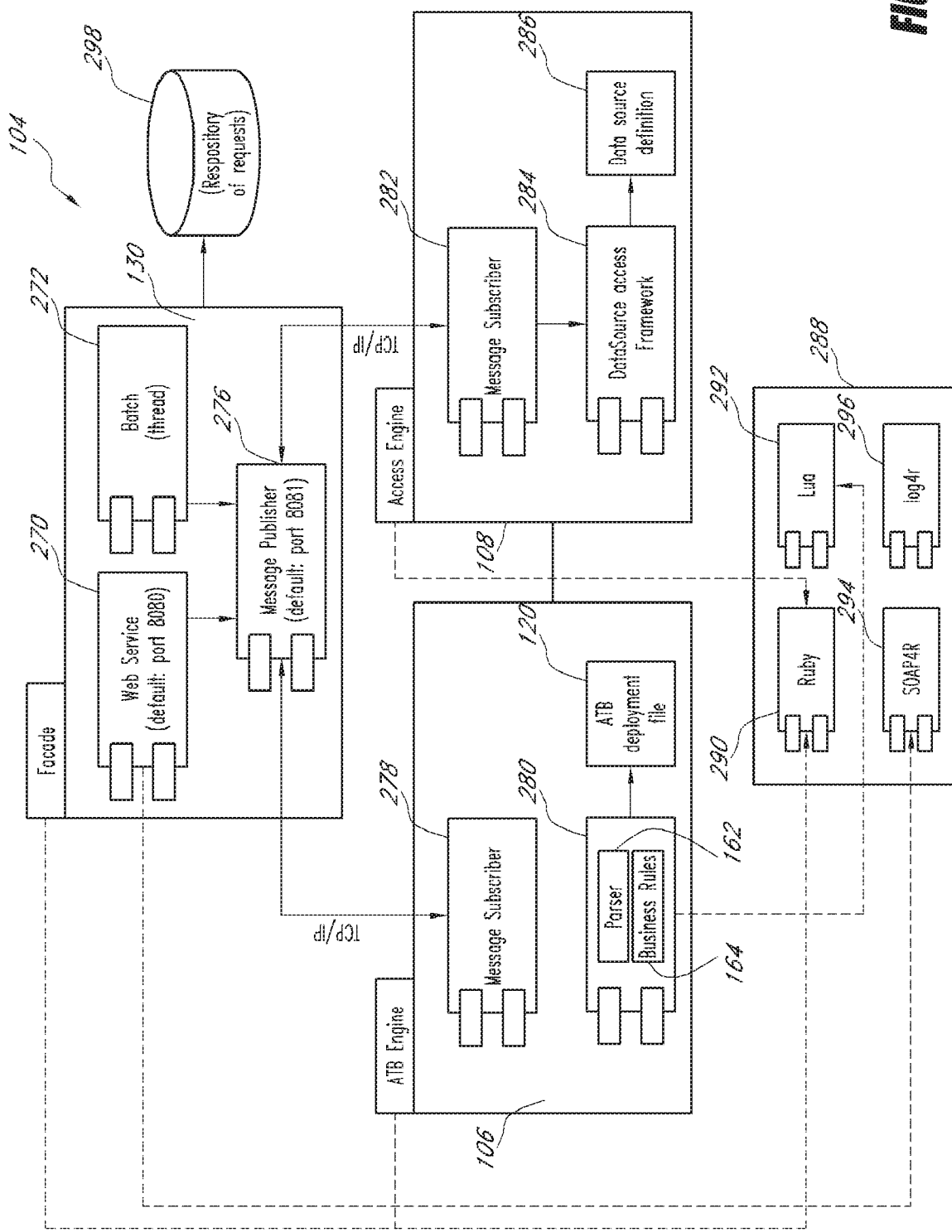
FIG. 4B is a schematic diagram showing the implementation of the ATB engine system according to one embodiment.

FIG. 4B is a schematic diagram showing the implementation of the ATB engine system 104 according to one embodiment. The façade 130 includes two methods of accepting requests. It has a web service component 270 and a batch component 272. In one embodiment, the web service component 270 is supported by a SOAP4R component 294 within technical services 288. SOAP4R is a Simple Object Access Protocol (SOAP) implementation in the Ruby programming language. The web service component 270 thus accepts SOAP requests from calling applications. Alternatively, the batch component 272 reads batched requests in a repository 298. In one embodiment, the repository 298 is a hard drive.

In either case, once an incoming request has been received, the façade 130 begins the process of managing the request and performs the necessary work in order to return a response to the request. First, the façade 130 has a message publisher 276 that will publish a message to either the ATB engine 106 or the data access engine 108. In one embodiment, the message is a RPC sent via the TCP/IP protocol. The façade 130 includes managing logic that will handle the sequence in which RPCs are sent. The façade 130 additionally includes a profile component that handles a variety of work-flow logic as described earlier.

Both the ATB engine 106 and the data access engine 108 have a message subscriber component that subscribes to the message publisher 276. In the ATB engine 106, once the message subscriber 278 receives a message from the message publisher 276, it will instruct business component 280 to perform calculations. In one embodiment, business component 280 further comprises the parser 162 and the business rules component 164. The business rules component 164 performs calculations based on the attributes and filters within deployment package 120, using data parsed by the parser 162. In one embodiment, the business component 280 is implemented in the Lua scripting language, which provides fast execution times and increased performance. This is particularly important in some embodiments because the ATB engine system may be configured to receive a high volume of requests from the batch component 272 and to accept a large number of requests from calling applications through the web service 270. The façade 130 and the access engine 108 are implemented in the Ruby programming language in one embodiment.

Access engine 108 also includes the aforementioned message subscriber 282 and a data source access framework 284. After the message subscriber 282 receives a message from the message publisher 276, it will instruct the data source access framework 284 to access the requested data. The data source access framework reads a data source definition file 286 in order to determine the data formats of the various data sources that are being accessed. Finally, technical services 288 include a log4r component that provides logging capability for debugging purposes.

Attribute Interfaces

FIG. 5A is an example computer screen showing the attribute search/browse interface 152 in the ATB UI 102 according to one embodiment. As shown, a search panel 302 is provided so users can search for attributes by various parameters such as name/keyword, system, and format. In response, the ATB UI 102 displays a sortable list 304 of attributes stored in the repository 118 that match the search parameters. For each attribute, the ATB UI 102 shows the system in which the attribute is being deployed, as well as whether the attribute is locked by another user who is viewing or editing it.

The ATB UI 102 facilitates the management of the attributes and removes some of the difficulties of having to manually configure the deployment of attributes. Because the UI provides a comprehensive view of how attributes are deployed in various systems, users can quickly and easily view the dependencies between attributes and the associated systems and determine how editing an attribute will affect the systems in their deployment scheme. In addition, because the name of each attribute listed is a link to the attribute development interface with that selected attribute shown in a coding area, the users can quickly launch into the development environment from the list 304.

Figure 5B:
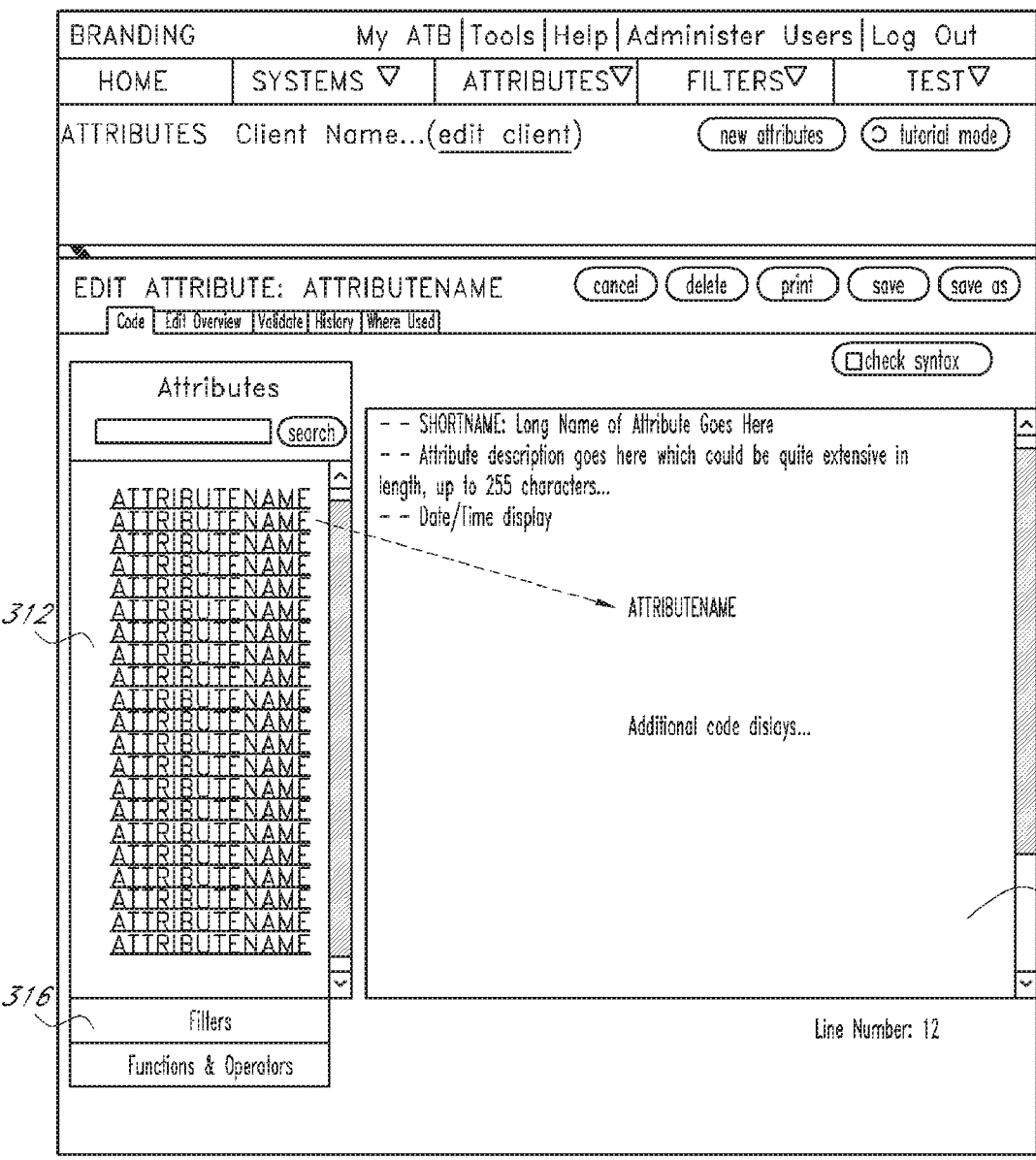
FIG. 5B is an example computer screen showing the attribute development interface according to one embodiment.

FIG. 5B is an example computer screen showing how attributes can be edited in the attribute development interface 150 according to one embodiment. As shown, an example attribute is being edited or created in a coding area 314. Because attributes often reference numerous other attributes, filters, functions, and operators, the development interface 150 provides a panel 312 that lists other attributes, filters, functions, and operators that can be inserted into the coding area 314. This ensures that the newly created attribute or the edited attribute will have the proper dependencies. In one embodiment, the list is populated by the attributes and filters retrieved from the repository 118. Any attribute or filter listed can be moved (for example, dragged and dropped) into the coding area 314, and a proper reference to that attribute or filter automatically appears within the coding area 314.

In addition, the panel 312 has a tab area 316, which has two other tabs "filters" and "functions & operators" as shown. A user can select one of the other tabs and brings up either the filters or the functions and operators that are available. Likewise, these elements can be dragged and dropped into the coding area 314 and the proper references are automatically created. FIG. 5C shows an example of the panel 312 after a user selects the "functions &operators" tab within the tab area 316. Any of the functions and operators shown can be moved (for example, dragged and dropped) into the coding area 314. Therefore, the development interface 150 enables users to rapidly code new attributes or modify existing attributes with accurate references to other attributes, filters, functions, and operators.

Filter Interfaces

Figure 6A:
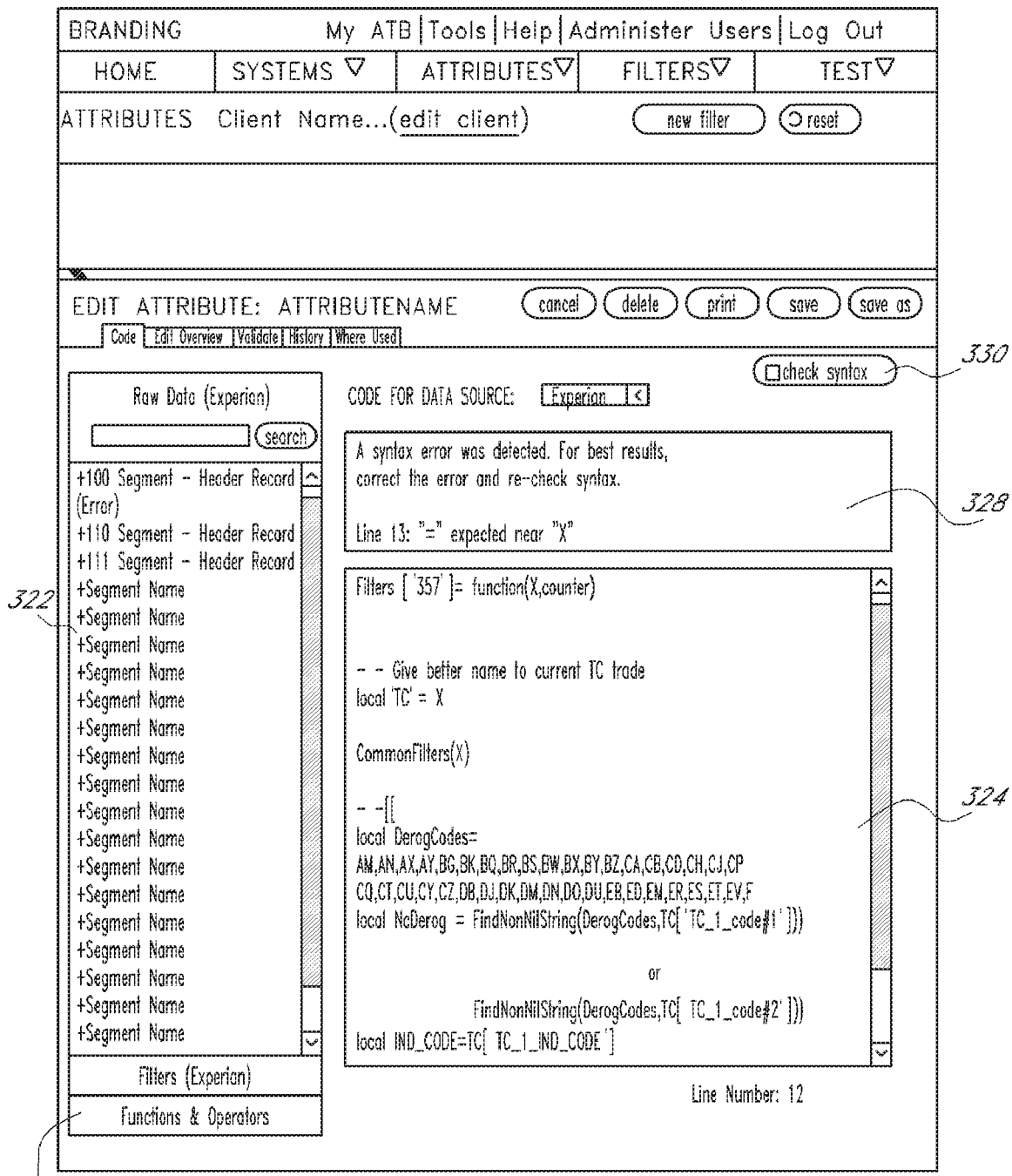
FIG. 6A is an example computer screen showing the filter development interface according to one embodiment.

FIG. 6A is one embodiment of an example computer screen of the filter development interface 150. Similar to the attribute development interface shown in FIG. 5B, the filter development interface presents other filters, functions, and operators in a panel 322 that can be dragged and dropped into a coding area 324.

Coding Filters for Various Data Sources

Because of the complexities of database definitions, the task of developing filters on raw data is often left to programmers. To overcome this problem, the filter development interface 150 simplifies the task of developing filters for various data sources by showing the data fields within segments of the data sources. Therefore, in addition to filters, functions, and operators, the filter development interface has a "raw data" tab in the tab area 326. As shown in FIG. 6A, the available data segments in the data source "Experian" are listed in the panel 322. The fields within the segments are available to be dragged and dropped into the coding area 324. As shown, the coding area 324 shows the codes the filter that is being developed.

Figure 6B:
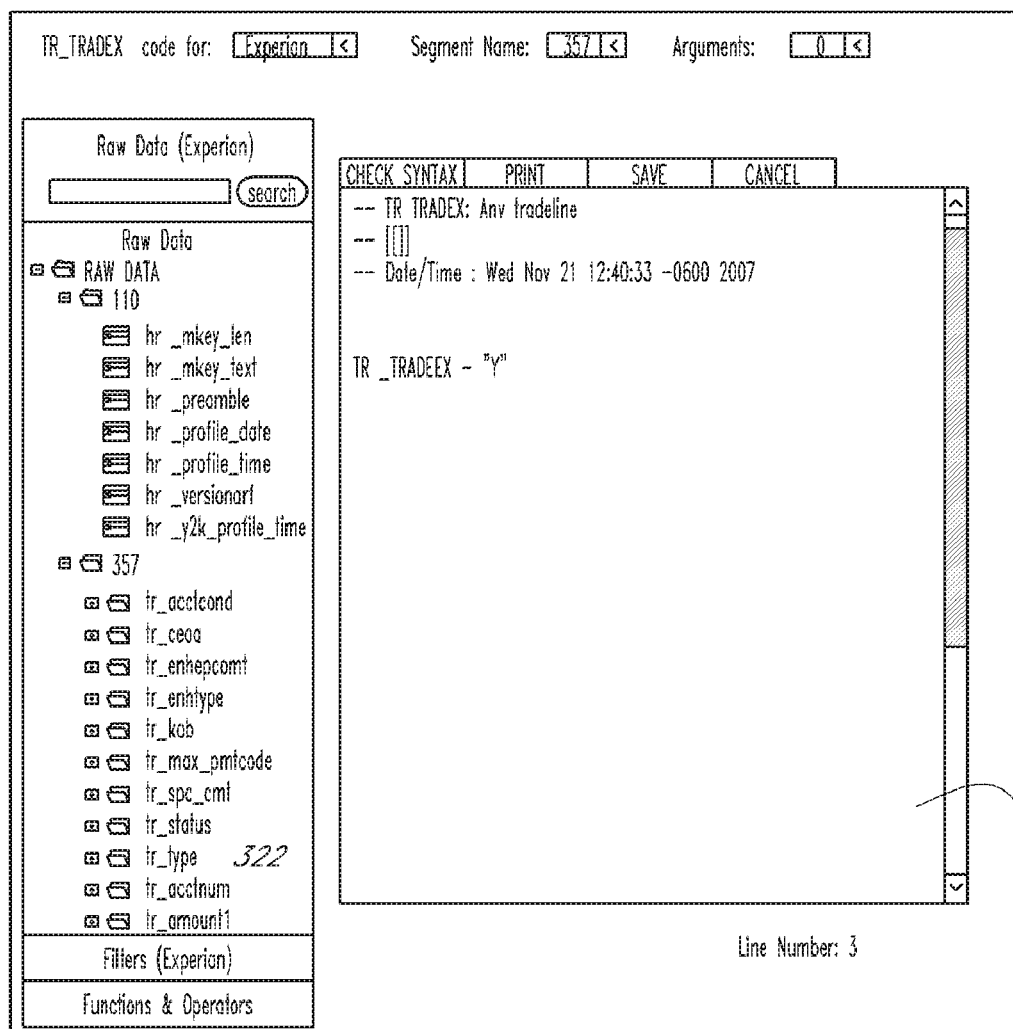
FIG. 6B is an example computer screen showing how details of a selected data source are displayed in the filter development interface according to one embodiment.

FIG. 6B is an example computer screen showing how filters can be developed for different data sources in the ATB UI. As shown in FIG. 6B, data fields for a selected segment within a selected data source are listed in the panel 322. Drop down boxes 320 include a data source drop-down box, a segment drop-down box, and an argument drop-down box. The data source is selected at the data source drop-down box, and the data segment is selected at the segment drop-down box and so on. In this example, the "Experian" data source has been selected and a segment has also been selected. In one embodiment, all available valid segments associated with the selected data source are listed in the segment drop-down box.

In one embodiment, once a segment is selected, all the available data fields are shown within the panel 322. The user can drag and drop a field into the coding area 324. Through the filter development interface 150, a user can easily scan through the available fields within the segments in a data source and quickly and accurately add the necessary fields to a filter that is currently being edited in the coding area 324. This interface minimizes errors and speeds up the development of filters for multiple data sources with different data formats.

Figure 6C:
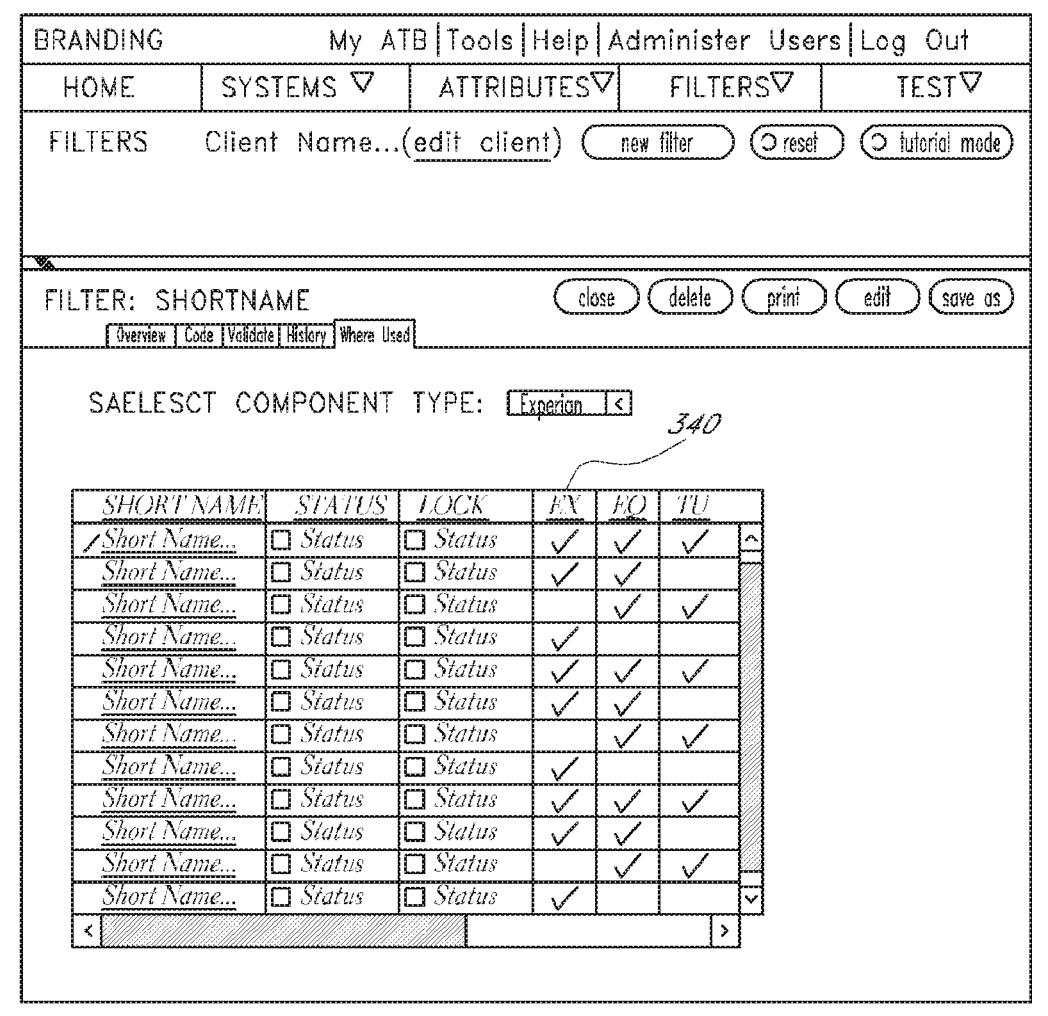

FIG. 6C is a computer screen showing the filter search/browse interface 152. Much like the interface shown FIG. 5A for attributes, users can search for filters and the search results will be displayed in a listing 340. Each filter is listed with status information, whether it has been locked by another user for editing, and whether it has been encoded for a particular data source (as indicated by the check marks). Clicking on the name of the filter will launch a development interface similar to the one shown in FIG. 6A, where the user can edit the selected filter.

Syntax Checking and Validation

In one embodiment, ATB UI provides a syntax checking engine that checks the syntax of a filter or an attribute within a current coding area if requested by the user. As shown in FIG. 6A, once the user selects a "Check Syntax" button 330, the ATB UI will run a syntax check on either the filter or attribute that is currently being edited. For example, FIG. 6A shows the syntax check window 328 displaying a message indicating that the syntax check engine has discovered a syntax error on line 13 of the example filter. The syntax check engine can likewise check for syntax errors within an attribute. Thus users of the ATB UI can avoid saving invalid filters or attributes. In other embodiments, a syntax check is automatically performed when a user attempts to save a filter or an attribute to the repository 118, or save changes to an existing filter or attribute.

Besides a syntax checking engine, embodiments of ATB UI also provide the validation interface 156 and the validation engine 160 (shown in FIG. 1) through which users can validate attributes against test data. FIG. 7 shows an example computer screen of the validation interface 156. The validation interface 156 includes an information/selection area 350, which further includes a data file selector 352 and a data source selector 354. Using the data file selector 354, the user can select a sample test file including test data for the data source that the user selects in the data source selector 354. In the example shown, the user has selected a file including sample data from the data source "Experian" to be sent to the validation engine 160. In one embodiment, the validation engine 160 accepts test files for in the ARF format.

In the example shown in FIG. 7, the validation engine 160, through the validation interface 156, provides a result 358 for the selected attribute "ALL002." The validation engine 160 has calculated the attribute "ALL002" against the test data and has determined that the result is 52.0. More importantly, the validation interface 156 further includes a validation table 356 in which a user can examine the raw data and the dependencies within the attribute that is undergoing validation. The column headings of the validation table 356 show all the depending filters and attributes referenced in the code of attribute "ALL002." The rows of the validation table 356 show raw data from the test file.

The validation interface 156 advantageously allows the user to see exact results returned by each filter or attribute referenced by the attribute that is being validated. This enables the user to quickly determining any errors or performance problems hidden in the chain of dependencies. The user can, for example, quickly determine that a filter is selecting a wrong field or that an attribute calculation is returning erroneous or undesirable results. The validation interface 156 is particularly helpful in the development of aggregation attributes, which often reference a large number of attributes and filters.

System Management

FIG. 8A is one embodiment of an example computer screen showing how a client can be created in the ATB UI. An input interface 360 solicits configuration information that is needed to create a new client. The input interface 360 includes a listing of data sources that the new client will access, as well as a listing of systems that will be associated with this new client. When the user attempts to save the client configuration information, the ATB UI will check for errors and display an error message 362 (as shown) if needed.

Figure 8B:
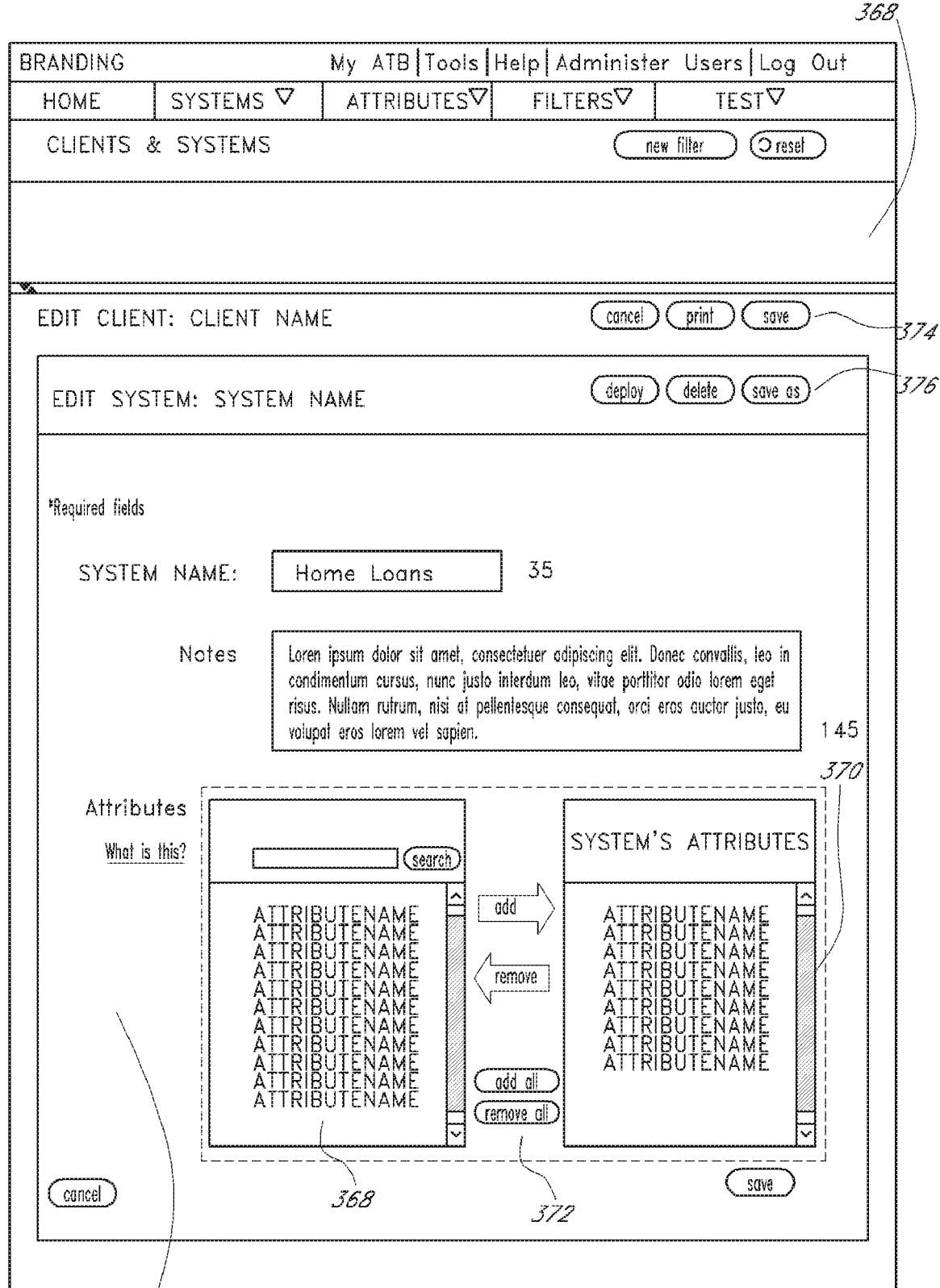
FIG. 8B is an example computer screen showing how attributes can be associated with a client system for deployment according to one embodiment.

FIG. 8B is one embodiment of an example computer screen showing how attributes can be associated with a client system for deployment. As an example, a client who is a bank may wish to deploy various systems associated with its needs. The bank may thus have one system that screens potential home loan applicants and another system for finding prospective commercial credit card applicants. Because each system requires different data and calculations, the bank client may wish to configure each one differently. The ATB UI provides an interface 366 to allow a client user to associate various attributes to a system for deployment. The interface 366 includes an available attribute listing 368 and a deployment attribute listing 370. The user can search for and browse attributes that are available deployment in the listing 368 and then add the attributes to the deployment listing 370 by using an arrow selector 372. The attributes will then be slated for deployment for the particular system.

FIG. 8C is one embodiment of an example computer screen showing how multiple client system deployments are managed in the ATB UI. A system listing 380 lists systems that are available for deployment. Each system is listed with a name, a historical data entry including the date of last deployment, status, and the number of associated attributes. Under the status column, the ATB UI may indicate whether a system is ready or not ready for deployment. Some systems may not be ready to be deployed because they may have attributes with syntax errors or no attributes at all. The system listing 380 provides a way for the user to browse through the available systems and quickly determine which are ready for deployment. Furthermore, the ATB UI provides a link to the attributes so the user can quickly view or edit the attributes associated with the systems. The user is also given the option to select multiple systems from the listing 380 and deploy all of them at the same time. The deployment package 120 is then automatically created and can be used in ATB engine system 104.

Managing Data Sources and Attribute Exports

FIG. 9A is one embodiment of an example computer screen showing how multiple data sources are managed in the ATB UI 102. The ATB UI 102 provides a data source listing 386 that lists the available data sources. Each entry lists the short and long names of the data source as well as the time when the data source was last modified. The ATB UI 102 also provides a data source area 388 that displays the detail information of a data source that has been selected. The user can then view or edit the details of a particular data source, including the location of the file from which data can be obtained.

FIG. 9B is one embodiment of an example computer screen shot showing how attributes can be exported to a file. A system listing 390 provides a listing of systems that can be exported. Once exported, the file will include all attributes associated with the selected system. The export function allows multiple users from various sites to collaborate on a project. In one embodiment, users at remote sites without access to the centralized repository can run their own copies of the ATB UI 102. For example, a first user may be developing attributes and filters on a laptop while traveling. The export function enables the first user to export the attributes and filters and send the export file to a second user who runs a different instance of the ATB UI 102 that has a connection to a centralized repository. The second user will then be able to import the attributes created by the first user and save the attributes to the centralized repository. In one embodiment, the ATB UI 102 checks the import file against the repository, so that duplicate attributes are shown to the user. The second user will then have the option of overwriting the attributes that are in the repository with the imported version. In this manner, numerous users from various remote locations, even those without connection to a centralized attribute repository, can independently develop attributes and filters and merge their work later.

Various Embodiments of System and Method Implementations

In one embodiment, the systems and methods for generating and calculating attributes may be embodied in part or in whole in software that is running on one or more computing devices. The functionality provided for in the components and modules of the computing device(s) may comprise one or more components and/or modules. For example, the computing device(s) may comprise multiple central processing units (CPUs) and one or more mass storage device(s), such as may be implemented in an array of servers.

In general, the word "module," "application", or "engine," as used herein, refers to logic embodied in hardware and/or firmware, and/or to a collection of software instructions, possibly having entry and exit points, written in a programming language, such as, for example, Java, Ruby, Ruby on Rails, Lua, C and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information, including credit data and/or non-credit data. This database or databases may be implemented using a relational database, such as SQLite, Sybase, Oracle, CodeBase, mySQL, and Microsoft® SQL Server as well as other types of databases such as, for example, a flat file database, an entity-relationship database, and object-oriented database, and/or a record-based database.

In one embodiment, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In one embodiment, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the invention.

What is claimed is:

1. A system for generating attributes, the system comprising:
   one or more processors; and
   non-transitory computer storage comprising code executable by the one or more processors, the executable code causing the one or more processors to:
   receive, via a user interface, a user selection of at least one attribute that relates to a type of credit data;
   identify a credit data attribute formula expression based on the received user selection;
   extract a subset of first data from a first data source in accordance with a first filter and extract a subset of second data from a second data source in accordance with a second filter, wherein the first data source stores first data associated with the type of credit data in a first format and the second data source stores second data associated with the type of credit data in a second format different from the first format; and
   generate a deployment package that applies the extracted subsets of data to the credit data attribute formula expression to generate at least one attribute score for the at least one attribute, wherein the deployment package is deployed to a computer system, and wherein the computer system is configured to generate the at least one attribute score based on one or more computer instructions included within the deployment package.

2. The system of claim 1 wherein the executable code further causes the one or more processors to display, via the user interface, the subset of first data extracted in accordance with the first filter and the subset of second data extracted in accordance with the second filter.

3. The system of claim 1 wherein the executable code further causes the one or more processors to identify the first and second filters.

4. The system of claim 1 wherein the first filter is configured to map one or more data fields in the first data source to the type of credit data and the second filter is configured to map one or more data fields in the second data source to the type of credit data.

5. The system of claim 1 wherein the executable code further causes the one or more processors to identify the first and second data sources.

6. The system of claim 5 wherein the first data source comprises a first credit bureau data source and the second data source comprises a second credit bureau data source.

7. The system of claim 1 wherein the user interface comprises a validation user interface that is configured to display information in a format that allows identification of errors in one or more of the first filter, the second filter, or the credit data attribute formula expression.

8. The system of claim 1 wherein identifying the credit data attribute formula expression based on the received user selection includes identifying the credit data attribute formula expression based on the received user selection and at least one function or at least one operator.

9. A computer-implemented method for generating attributes, the computer-implemented method comprising:
receiving, via a user interface, a user selection of at least one attribute that relates to a type of credit data;
identifying a credit data attribute formula expression based on the received user selection;
extracting a subset of first data from a first data source in accordance with a first filter and extracting a subset of second data from a second data source in accordance with a second filter, wherein the first data source stores first data associated with the type of credit data in a first format and the second data source stores second data associated with the type of credit data in a second format different from the first format; and
generating a deployment package that applies the extracted subsets of data to the credit data attribute formula expression to generate at least one attribute score for the at least one attribute, wherein the deployment package is deployed to a computer system, and wherein the computer system is configured to generate the at least one attribute score based on one or more computer instructions included within the deployment package.

10. The computer-implemented method of claim 9 further comprising displaying, via the user interface, the subset of first data extracted in accordance with the first filter and the subset of second data extracted in accordance with the second filter.

11. The computer-implemented method of claim 9 further comprising mapping, with the first filter, one or more data fields in the first data source to the type of credit data.

12. The computer-implemented method of claim 9 further comprising mapping, with the second filter, one or more data fields in the second data source to the type of credit data.

13. The computer-implemented method of claim 9 further comprising displaying, via the user interface, one or more of the first filter, the second filter, or the credit data attribute formula expression in a format that allows identification of errors.

14. The computer-implemented method of claim 9 wherein identifying the credit data attribute formula expression based on the received user selection includes identifying the credit data attribute formula expression based on the received user selection and at least one function or at least one operator.

15. The computer-implemented method of claim 9 further comprising checking for syntax errors in one or more of the first filter and the second filter.

16. A non-transitory computer storage medium which stores a client application comprising executable code, the executable code causing a computing device to:
receive, via a user interface, a user selection of at least one attribute that relates to a type of credit data;
identify a credit data attribute formula expression based on the received user selection;
extract a subset of first data from a first data source in accordance with a first filter and extract a subset of second data from a second data source in accordance with a second filter, wherein the first data source stores first data associated with the type of credit data in a first format and the second data source stores second data associated with the type of credit data in a second format different from the first format; and
generate a deployment package that applies the extracted subsets of data to the credit data attribute formula expression to generate at least one attribute score for the at least one attribute, wherein the deployment package is deployed to a computer system, and wherein the computer system is configured to generate the at least one attribute score based on one or more computer instructions included within the deployment package.

17. The non-transitory computer storage medium of claim 16 wherein the executable code further causes the computing device to display, via the user interface, the subset of first data extracted in accordance with the first filter and the subset of second data extracted in accordance with the second filter.

18. The non-transitory computer storage medium of claim 16 wherein the executable code further causes the computing device to map, using the first filter, one or more data fields in the first data source to the type of credit data and map, using the second filter, one or more data fields in the second data source to the type of credit data.

19. The non-transitory computer storage medium of claim 16 wherein the executable code further causes the computing device to display, via the user interface, information in a format that allows identification of errors in one or more of the first filter, the second filter, or the credit data attribute formula expression.

20. The non-transitory computer storage medium of claim 16 wherein identifying the credit data attribute formula expression based on the received user selection includes identifying the credit data attribute formula expression based on the received user selection and at least one function or at least one operator.

* * * * *